US011993097B2

(12) United States Patent
Sanada et al.

(10) Patent No.: US 11,993,097 B2
(45) Date of Patent: May 28, 2024

(54) MECHANICAL PENCIL

(71) Applicant: KABUSHIKI KAISHA PILOT CORPORATION, Tokyo-to (JP)

(72) Inventors: Yusuke Sanada, Tokyo-to (JP); Nobukazu Seri, Tokyo-to (JP); Yuji Kawarazaki, Tokyo-to (JP); Takumi Kajiwara, Tokyo-to (JP); Tomoharu Oonishi, Tokyo-to (JP)

(73) Assignee: KABUSHIKI KAISHA PILOT CORPORATION, Tokyo-To (JP)

( * ) Notice: Subject to any disclaimer, the term of this patent is extended or adjusted under 35 U.S.C. 154(b) by 227 days.

(21) Appl. No.: 17/620,963

(22) PCT Filed: Jun. 17, 2020

(86) PCT No.: PCT/JP2020/023862
§ 371 (c)(1),
(2) Date: Dec. 20, 2021

(87) PCT Pub. No.: WO2020/256037
PCT Pub. Date: Dec. 24, 2020

(65) Prior Publication Data

US 2022/0410614 A1 Dec. 29, 2022

(30) Foreign Application Priority Data

Jun. 20, 2019 (JP) ................................ 2019-114920
Jun. 20, 2019 (JP) ................................ 2019-114924

(51) Int. Cl.
*B43K 21/16* (2006.01)
*B43K 21/00* (2006.01)

(52) U.S. Cl.
CPC ............ *B43K 21/16* (2013.01); *B43K 21/003* (2013.01); *B43K 21/006* (2013.01)

(58) Field of Classification Search
CPC .............................. B43K 21/006; B43K 21/22
See application file for complete search history.

(56) References Cited

U.S. PATENT DOCUMENTS 4,619,539 A 10/1986 Kageyama
4,705,419 A 11/1987 Niemeyer
(Continued)

FOREIGN PATENT DOCUMENTS

EP 1118476 A2 * 7/2001 ........... B43K 21/045
JP 49-88821 8/1974
(Continued)

OTHER PUBLICATIONS

Office Action dated Nov. 18, 2022 in corresponding Chinese Patent Application No. 202080044845.4, with English translation.
(Continued)

*Primary Examiner* — David P Angwin
*Assistant Examiner* — Bradley S Oliver
(74) *Attorney, Agent, or Firm* — WENDEROTH, LIND & PONACK, L.L.P.

(57) ABSTRACT

A mechanical pencil has: a shaft tube; a ferrule unit supported by the shaft tube; a lead holding unit having a chuck configured to relatively move with respect to the ferrule unit to eject lead held by the same; and an indication body provided movably in an axial direction. The indication body delimits from rearward a lead storage space formed rearward the chuck in the shaft tube. The indication body located at least at a predetermined position is viewable from outside the shaft tube. A length along the axial direction between a rear end of the lead storage space and a front end of the ferrule unit, in a state where the indication body has moved most rearward along the axial direction, is equal to or more than twice a length of spare lead to be stored in the lead storage space.

10 Claims, 14 Drawing Sheets

(56) References Cited

U.S. PATENT DOCUMENTS

| | | | | |
|---|---|---|---|---|
| 5,354,141 A * | 10/1994 | Watanabe | B43K 21/22 | 401/115 |
| 6,767,150 B1 * | 7/2004 | Sheu | B43K 21/22 | 401/89 |
| 2010/0061792 A1 * | 3/2010 | Koreska | B43K 21/006 | 401/75 |

FOREIGN PATENT DOCUMENTS

| | | |
|---|---|---|
| JP | 54-20730 | 2/1979 |
| JP | 54-33737 | 3/1979 |
| JP | 57-49258 | 3/1982 |
| JP | 60-132376 | 9/1985 |
| JP | 2000-318372 | 11/2000 |
| JP | 2010-94954 | 4/2010 |
| WO | 2011/067913 | 6/2011 |

OTHER PUBLICATIONS

International Search Report dated Sep. 15, 2020 in corresponding International Application No. PCT/JP2020/023862.

Office Action dated Apr. 14, 2021 in corresponding Taiwanese Application No. 109120558 (with English translation).

Extended European Search Report dated Jun. 28, 2023 in corresponding European Patent Application No. 20827925.7.

Japanese Office Action dated Feb. 14, 2023 in Japanese Patent Application No. 2019-114920, with machine translation.

Japanese Office Action dated Feb. 14, 2023 in Japanese Patent Application No. 2019-114924, with machine translation.

International Preliminary Report on Patentability dated Dec. 21, 2021 in corresponding International Application No. PCT/JP2020/023862.

* cited by examiner

MECHANICAL PENCIL

TECHNICAL FIELD

The present disclosure relates to a mechanical pencil.

BACKGROUND ART

A mechanical pencil in which lead can be ejected from a front end thereof is known. The mechanical pencil is used for writing on a sheet of paper or the like, with the lead protruding from the front end. The mechanical pencil has, in a shaft tube, a lead storage space for storing spare lead. When the spare lead in the lead storage space is used up, the lead storage space is replenished with another spare lead.

Mechanical pencils disclosed in JP1979-33737A and JP1979-20730A have an indication body which delimits a lead storage space from rearward. The indication body is movable in an axial direction. When there is no spare lead in the lead storage space, the indication body is located forward. On the other hand, when there is spare lead in the lead storage space, the indication body is located rearward. Whether there is spare lead in the lead storage space can be known by the position of the indication body seen from outside the shaft tube.

During the use of a mechanical pencil, new spare lead may be inserted from a front end opening through which lead is ejected, and lead protruding greatly from the front end opening of the mechanical pencil may be retracted into the mechanical pencil. At this time, there is a possibility that the lead inserted toward the lead storage space of the mechanical pencil is aligned with spare lead in the lead storage space. In this case, a trouble may occur in that the lead cannot be completely inserted into the mechanical pencil, or even that the lead is broken. In particular, such a trouble is likely to occur in a mechanical pencil having an indication body which has a long axial length in order to be easily visible.

The present invention has been made in view of the above circumstances. A first object of the present invention is to deal with a trouble in which, since lead held in a lead holding unit of a mechanical pencil is aligned with spare lead in a lead storage space, the lead cannot be retracted, and/or a trouble in which the lead and/or the spare lead is broken.

In the mechanical pencils disclosed in JP1979-33737A and JP1979-20730A, lead powder in the lead storage space may enter between the indication body and a tubular portion movably supporting the indication body. In this case, an inner surface of the tubular portion may become contaminated with lead powder, so that it may become difficult to see the indication body from outside the tubular portion. The present invention has been made in view of this point. A second object of the present invention is to effectively prevent the visibility of the indication body from being impaired by lead powder in the lead storage space.

DISCLOSURE OF THE INVENTION

The first object of the present invention is achieved by a first embodiment of the present invention.

A first mechanical pencil according to a first embodiment of the present invention comprises:

a shaft tube;

a ferrule unit supported by the shaft tube;

a lead holding unit having a chuck configured to relatively move with respect to the ferrule unit to eject lead held by the lead holding unit; and an indication body provided movably in an axial direction and delimiting from rearward a lead storage space formed rearward the chuck in the shaft tube;

wherein:

the indication body located at least at a predetermined position is viewable from outside the shaft tube; and a length along the axial direction between a rear end of the lead storage space and a front end of the ferrule unit, in a state where the indication body has moved most rearward along the axial direction, is equal to or more than twice a length of spare lead to be stored in the lead storage space.

A second mechanical pencil according to the first embodiment of the present invention comprises:

a shaft tube;

a ferrule unit supported by the shaft tube;

a lead holding unit having a chuck configured to relatively move with respect to the ferrule unit to eject lead held by the lead holding unit; and an indication body provided movably in an axial direction and delimiting from rearward a lead storage space formed rearward the chuck in the shaft tube;

wherein:

the indication body located at least at a predetermined position is viewable from outside the shaft tube;

a lead ejection aperture having an inside dimension allowing insertion of only single lead is opened in a front wall surface delimiting the lead storage space from a front side in the axial direction, the lead ejection aperture being in communication with the chuck;

the front wall surface is inclined rearward in the axial direction as it separates away from the lead ejection aperture along a direction perpendicular to the axial direction; and an inclination angle of the front wall surface with respect to the axial direction is more than 45° and less than 85°.

A third mechanical pencil according to the first embodiment of the present invention comprises:

a shaft tube;

a ferrule unit supported by the shaft tube;

a lead holding unit having a chuck configured to relatively move with respect to the ferrule unit to eject lead held by the lead holding unit; and an indication body provided movably in an axial direction and delimiting from rearward a lead storage space formed rearward the chuck in the shaft tube;

wherein:

the indication body located at least at a predetermined position is viewable from outside the shaft tube; and the lead storage space has, at an intermediate part thereof in the axial direction, a reduced width part having a narrow width.

In the first to third mechanical pencils according to the first embodiment of the present invention, the indication body supported on spare lead stored in the lead storage space may be viewable from outside the shaft tube.

In the first to third mechanical pencils according to the first embodiment of the present invention, the indication body which is located forward along the axial direction the position at which the indication body is supported on spare lead stored in the lead storage space may be viewable from outside the shaft tube.

In the first to third mechanical pencils according to the first embodiment of the present invention, the display body supported on spare lead stored in the lead storage space, and the indication body which is located forward along the axial direction the position at which the indication body is supported on spare lead stored in the lead storage space may be viewable from outside the shaft tube as different indications.

In the first to third mechanical pencils according to the first embodiment of the present invention, a length of the lead storage space in a state where the indication body has moved most rearward along the axial direction may be longer than a length of the spare lead.

In the first to third mechanical pencils according to the first embodiment of the present invention, a length of the lead storage space in a state where the indication body has moved most forward along the axial direction may be shorter than a length of the spare lead.

In the first to third mechanical pencils according to the first embodiment of the present invention, the indication body may be provided with a recess opened forward in the axial direction.

In the first to third mechanical pencils according to the first embodiment of the present invention, a depth of the recess along the axial direction may be larger than half of a length of the indication body along the axial direction.

In the first to third mechanical pencils according to the first embodiment of the present invention, the indication body may have an inside wall surface and a bottom wall surface delimiting the recess; and the bottom wall surface may be non-parallel to the axial direction.

In the first to third mechanical pencils according to the first embodiment of the present invention, a length along the axial direction between a front end of the lead storage space and the front end of the ferrule unit may be shorter than a length of the spare lead.

In the first to third mechanical pencils according to the first embodiment of the present invention, a front wall surface delimiting the lead storage space from a front side in the axial direction may be provided;

a lead ejection aperture having an inside dimension allowing insertion of only single lead may be opened in the front wall surface, the lead ejection aperture being in communication with the chuck; and a length along the axial direction between a front end of the lead storage space and the front end of the ferrule unit may be longer than half of the length of the spare lead.

In the first to third mechanical pencils according to the first embodiment of the present invention, a lead ejection aperture having an inside dimension allowing insertion of only single lead may be opened in the front wall surface delimiting the lead storage space from a front side in the axial direction, the lead ejection aperture being in communication with the chuck;

the front wall surface may be inclined rearward in the axial direction as it separates away from the lead ejection aperture along a direction perpendicular to the axial direction; and an inclination angle of the front wall surface with respect to the axial direction may be more than 45° and less than 85°.

In the first to third mechanical pencils according to the first embodiment of the present invention, the front wall surface may be rotationally symmetrical.

In the first to third mechanical pencils according to the first embodiment of the present invention, the lead storage space may have, at an intermediate part thereof in the axial direction, a reduced width part having a narrow width.

In the first to third mechanical pencils according to the first embodiment of the present invention, a length along the axial direction from a front end of the lead storage space up to the reduced width part may be longer than half of the length of the spare lead, and may be shorter than the length of the spare lead.

The first to third mechanical pencils according to the first embodiment of the present invention may further comprise an intermediate tube member provided in the shaft tube movably in the axial direction;

wherein:

the lead holding unit further has a lead storage tube located rearward the chuck in the axial direction to form at least partly the lead storage space, the lead storage tube having an opened rear end inserted in the intermediate tube member;

the intermediate tube member has a tubular body part and an inner rib protruding from an inner surface of the tubular body part, and during forward movement along the axial direction, the inner rib comes into contact with a rear end surface of the lead storage tube to push the lead holding unit forward.

In the first to third mechanical pencils according to the first embodiment of the present invention, an inner width of the intermediate tube member at a position where the inner rib is provided may be smaller than an inner width of the lead storage tube.

In the first to third mechanical pencils according to the first embodiment of the present invention, a length along the axial direction from a front end of the lead storage space up to the inner rib may be longer than half of the length of the spare lead, and may be shorter than the length of the spare lead.

In the first to third mechanical pencils according to the first embodiment of the present invention, an inner width of the intermediate tube member at a position where the inner rib is provided may be larger than an inner width of the lead storage tube.

In the first to third mechanical pencils according to the first embodiment of the present invention, an inner width of the intermediate tube member at a position where the inner rib is provided may be equal to an inner width of the lead storage tube.

In the first to third mechanical pencils according to the first embodiment of the present invention, the indication body may have an indication body part extending in the axial direction, and a flange part protruding from the indication body part in a direction non-parallel to the axial direction.

In the first to third mechanical pencils according to the first embodiment of the present invention, a length of the flange part along the axial direction may be equal to or less than 1.5 mm.

In the first to third mechanical pencils according to the first embodiment of the present invention, the flange part may be provided on a front end portion of the indication body part.

In the first to third mechanical pencils according to the first embodiment of the present invention, the flange part may extend in a circumferential direction around the indication body part.

In the first to third mechanical pencils according to the first embodiment of the present invention, a window part allowing an inside of the shaft tube to be viewed may be provided on the shaft tube such that the window part at least partly overlaps a range where the indication body is movable in the axial direction, and the flange part may extend in the circumferential direction at least over a range where the window part is provided.

In the first to third mechanical pencils according to the first embodiment of the present invention, a window part allowing an inside of the shaft tube to be viewed may be provided on the shaft tube such that the window part at least partly overlaps a range where the indication body is movable in the axial direction, and the flange part of the indication body supported by spare lead stored in the lead storage space from forward in the axial direction may be located forward the window part in the axial direction.

In the first to third mechanical pencils according to the first embodiment of the present invention, a window part allowing an inside of the shaft tube to be viewed may be provided on the shaft tube such that the window part at least partly overlaps a range where the indication body is movable in the axial direction, and a recess may be formed in an inner surface of a region of a tubular portion accommodating the indication body movably in the axial direction, the region overlapping the window part in the circumferential direction.

In the first to third mechanical pencils according to the first embodiment of the present invention, the indication body may further have a rear flange part located rearward the flange part in the axial direction to protrude from the indication body part in a direction non-parallel to the axial direction.

In the first to third mechanical pencils according to the first embodiment of the present invention, a length of the rear flange part along the axial direction may be equal to or less than 1.5 mm.

In the first to third mechanical pencils according to the first embodiment of the present invention, the rear flange part may be provided on a rear end portion of the indication body part.

In the first to third mechanical pencils according to the first embodiment of the present invention, the rear flange part may extend in the circumferential direction around the indication body part.

In the first to third mechanical pencils according to the first embodiment of the present invention, a window part allowing an inside of the shaft tube to be viewed may be provided on the shaft tube such that the window part at least partly overlaps a range where the indication body is movable in the axial direction, and the rear flange part of the indication body having moved most forward in the axial direction may be located rearward the window part in the axial direction.

In the first to third mechanical pencils according to the first embodiment of the present invention, a hole may be formed in a tubular portion accommodating the indication body movably in the axial direction.

In the first to third mechanical pencils according to the first embodiment of the present invention, the hole may be located rearward the indication body in the axial direction, the indication body having moved most rearward in the axial direction.

In the first to third mechanical pencils according to the first embodiment of the present invention, a hole may be formed in a tubular portion accommodating the indication body movably in the axial direction;

a length of the hole along the axial direction may be longer than a length of the rear flange part along the axial direction.

In the first to third mechanical pencils according to the first embodiment of the present invention, an area of the hole may be larger than an area of a gap between the tubular portion and the indication body in a section perpendicular to the axial direction.

The first to third mechanical pencils according to the first embodiment of the present invention may further comprise a knock unit provided in the shaft tube movably in the axial direction, and configured to push the lead holding unit forward during forward movement in the axial direction, wherein the knock unit includes the tubular portion accommodating the indication body movably in the axial direction.

In the first to third mechanical pencils according to the first embodiment of the present invention, the shaft tube may include the tubular portion accommodating the indication body movably in the axial direction.

The first to third mechanical pencils according to the first embodiment of the present invention may further comprise an intermediate tube member provided in the shaft tube movably in the axial direction;

wherein:

the lead holding unit further has a lead storage tube located rearward the chuck in the axial direction to form at least partly the lead storage space, the lead storage tube having an opened rear end inserted in the intermediate tube member; and the tubular portion of the knock unit is inserted in the intermediate tube member from rearward in the axial direction.

The first embodiment of the present invention can effectively deal with a trouble in which, since lead held in a lead holding unit of a mechanical pencil is aligned with spare lead in a lead storage space, the lead cannot be retracted, and/or a trouble in which the lead and/or the spare lead is broken.

The second object of the present invention is achieved by a second embodiment of the present invention.

A first mechanical pencil according to a second embodiment of the present invention comprises:

a shaft tube;

a ferrule unit supported by the shaft tube;

a lead holding unit having a chuck configured to relatively move with respect to the ferrule unit to eject lead held by the lead holding unit; and an indication body provided movably in an axial direction and delimiting from rearward a lead storage space formed rearward the chuck in the shaft tube;

wherein:

the indication body located at least at a predetermined position is viewable from outside the shaft tube; and the indication body has an indication body part extending in the axial direction, and a flange part protruding from the indication body part in a direction non-parallel to the axial direction.

A second mechanical pencil according to the second embodiment of the present invention comprises:

a shaft tube;

a ferrule unit supported by the shaft tube;

a lead holding unit having a chuck configured to relatively move with respect to the ferrule unit to eject lead held by the lead holding unit; and an indication body provided movably in an axial direction and delimiting from rearward a lead storage space formed rearward the chuck in the shaft tube;

wherein:

the indication body located at least at a predetermined position is viewable from outside the shaft tube; and a hole is formed in a tubular portion accommodating the indication body movably in the axial direction.

In the first and second mechanical pencils according to the second embodiment of the present invention, a length of the flange part along the axial direction may be equal to or less than 1.5 mm.

In the first and second mechanical pencils according to the second embodiment of the present invention, the flange part may extend in a circumferential direction around the indication body part.

In the first and second mechanical pencils according to the second embodiment of the present invention, a window part allowing an inside of the shaft tube to be viewed may be provided on the shaft tube such that the window part at least partly overlaps a range where the indication body is movable in the axial direction, and the flange part may extend in the circumferential direction at least over a range where the window part is provided.

In the first and second mechanical pencils according to the second embodiment of the present invention, a window part allowing an inside of the shaft tube to be viewed may be provided on the shaft tube such that the window part at least partly overlaps a range where the indication body is movable in the axial direction, and the flange part of the indication body supported by spare lead stored in the lead storage space from forward in the axial direction may be located forward the window part in the axial direction.

In the first and second mechanical pencils according to the second embodiment of the present invention, a window part allowing an inside of the shaft tube to be viewed may be provided on the shaft tube such that the window part at least partly overlaps a range where the indication body is movable in the axial direction, and a recess may be formed in an inner surface of a region of a tubular portion accommodating the indication body movably in the axial direction, the region overlapping the window part in the circumferential direction.

In the first and second mechanical pencils according to the second embodiment of the present invention, the indication body may further have a rear flange part located rearward the flange part in the axial direction to protrude from the indication body part in a direction non-parallel to the axial direction.

In the first and second mechanical pencils according to the second embodiment of the present invention, a length of the rear flange part along the axial direction may be equal to or less than 1.5 mm.

In the first and second mechanical pencils according to the second embodiment of the present invention, the rear flange part may be provided on a rear end portion of the indication body part.

In the first and second mechanical pencils according to the second embodiment of the present invention, the rear flange part may extend in the circumferential direction around the indication body part.

In the first and second mechanical pencils according to the second embodiment of the present invention, a window part allowing an inside of the shaft tube to be viewed may be provided on the shaft tube such that the window part at least partly overlaps a range where the indication body is movable in the axial direction, and the rear flange part of the indication body having moved most forward in the axial direction may be located rearward the window part in the axial direction.

In the first and second mechanical pencils according to the second embodiment of the present invention, a hole may be formed in the tubular portion accommodating the indication body movably in the axial direction.

In the first and second mechanical pencils according to the second embodiment of the present invention, the hole may be located rearward the indication body in the axial direction, the indication body having moved most rearward in the axial direction.

In the first and second mechanical pencils according to the second embodiment of the present invention, a hole may be formed in the tubular portion accommodating the indication body movably in the axial direction, and a length of the hole along the axial direction may be longer than a length of the rear flange part along the axial direction.

In the first and second mechanical pencils according to the second embodiment of the present invention, an area of the hole may be larger than an area of a gap between the tubular portion and the indication body in a section perpendicular to the axial direction.

The first and second mechanical pencils according to the second embodiment of the present invention may further comprise a knock unit provided in the shaft tube movably in the axial direction, and configured to push the lead holding unit forward during forward movement in the axial direction, wherein the knock unit includes the tubular portion accommodating the indication body movably in the axial direction.

In the first and second mechanical pencils according to the second embodiment of the present invention, the shaft tube may include the tubular portion accommodating the indication body movably in the axial direction.

The first and second mechanical pencils according to the second embodiment of the present invention may further comprise an intermediate tube member provided in the shaft tube movably in the axial direction;

wherein:

the lead holding unit further has a lead storage tube located rearward the chuck in the axial direction to form at least partly the lead storage space, the lead storage tube having an opened rear end inserted in the intermediate tube member; and the tubular portion of the knock unit is inserted in the intermediate tube member from rearward in the axial direction.

In the first and second mechanical pencils according to the second embodiment of the present invention, a length along the axial direction between a rear end of the lead storage space and a front end of the ferrule unit, in a state where the indication body has moved most rearward along the axial direction, may be equal to or more than twice a length of spare lead to be stored in the lead storage space.

In the first and second mechanical pencils according to the second embodiment of the present invention, the indication body supported on spare lead stored in the lead storage space may be viewable from outside the shaft tube.

In the first and second mechanical pencils according to the second embodiment of the present invention, the indication body which is located forward along the axial direction the position at which the indication body is supported on spare lead stored in the lead storage space may be viewable from outside the shaft tube.

In the first and second mechanical pencils according to the second embodiment of the present invention, the display body supported on spare lead stored in the lead storage space, and the indication body which is located forward along the axial direction the position at which the indication body is supported on spare lead stored in the lead storage space may be viewable from outside the shaft tube as different indications.

In the first and second mechanical pencils according to the second embodiment of the present invention, a length of the lead storage space in a state where the indication body has moved most rearward along the axial direction may be longer than a length of the spare lead.

In the first and second mechanical pencils according to the second embodiment of the present invention, a length of the lead storage space in a state where the indication body has moved most forward along the axial direction may be shorter than a length of the spare lead.

In the first and second mechanical pencils according to the second embodiment of the present invention, the indication body may be provided with a recess opened forward in the axial direction.

In the first and second mechanical pencils according to the second embodiment of the present invention, a depth of the recess along the axial direction may be larger than half of a length of the indication body along the axial direction.

In the first and second mechanical pencils according to the second embodiment of the present invention, the indication body may have an inside wall surface and a bottom wall surface delimiting the recess, and the bottom wall surface may be perpendicular to the axial direction.

In the first and second mechanical pencils according to the second embodiment of the present invention, a length along the axial direction between a front end of the lead storage space and the front end of the ferrule unit may be shorter than a length of the spare lead.

In the first and second mechanical pencils according to the second embodiment of the present invention, a length along the axial direction between a front end of the lead storage space and the front end of the ferrule unit may be longer than half of a length of the spare lead.

In the first and second mechanical pencils according to the second embodiment of the present invention, a lead ejection aperture having an inside dimension allowing insertion of only single lead may be opened in a front wall surface delimiting the lead storage space from a front side in the axial direction, the lead ejection aperture being in communication with the chuck, the front wall surface may be inclined rearward in the axial direction as it separates away from the lead ejection aperture along a direction perpendicular to the axial direction, and an inclination angle of the front wall surface with respect to the axial direction may be more than 45° and less than 85°.

In the first and second mechanical pencils according to the second embodiment of the present invention, the front wall surface may be rotationally symmetrical.

In the first and second mechanical pencils according to the second embodiment of the present invention, the lead storage space may have, at an intermediate part thereof in the axial direction, a reduced width part having a narrow width.

In the first and second mechanical pencils according to the second embodiment of the present invention, a length along the axial direction from a front end of the lead storage space up to the reduced width part may be longer than half of the length of the spare lead, and may be shorter than the length of the spare lead.

The first and second mechanical pencils according to the second embodiment of the present invention may further comprise an intermediate tube member provided in the shaft tube movably in the axial direction, wherein:

the lead holding unit further has a lead storage tube located rearward the chuck in the axial direction to form at least partly the lead storage space, the lead storage tube having an opened rear end inserted in the intermediate tube member; and the intermediate tube member has a tubular body part and an inner rib protruding from an inner surface of the tubular body part, and during forward movement along the axial direction, the inner rib comes into contact with a rear end surface of the lead storage tube to push the lead holding unit forward.

In the first and second mechanical pencils according to the second embodiment of the present invention, an inner width of the intermediate tube member at a position where the inner rib is provided may be smaller than an inner width of the lead storage tube.

In the first and second mechanical pencils according to the second embodiment of the present invention, a length along the axial direction from a front end of the lead storage space up to the inner rib may be longer than half of the length of the spare lead, and may be shorter than the length of the spare lead.

In the first and second mechanical pencils according to the second embodiment of the present invention, an inner width of the intermediate tube member at a position where the inner rib is provided may be larger than an inner width of the lead storage tube.

In the first and second mechanical pencils according to the second embodiment of the present invention, an inner width of the intermediate tube member at a position where the inner rib is provided may be equal to an inner width of the lead storage tube.

The second embodiment of the present invention can effectively prevent visibility of the indication body from being impaired by lead powder in the lead storage space.

MODE FOR CARRYING OUT THE INVENTION

Figure 1:
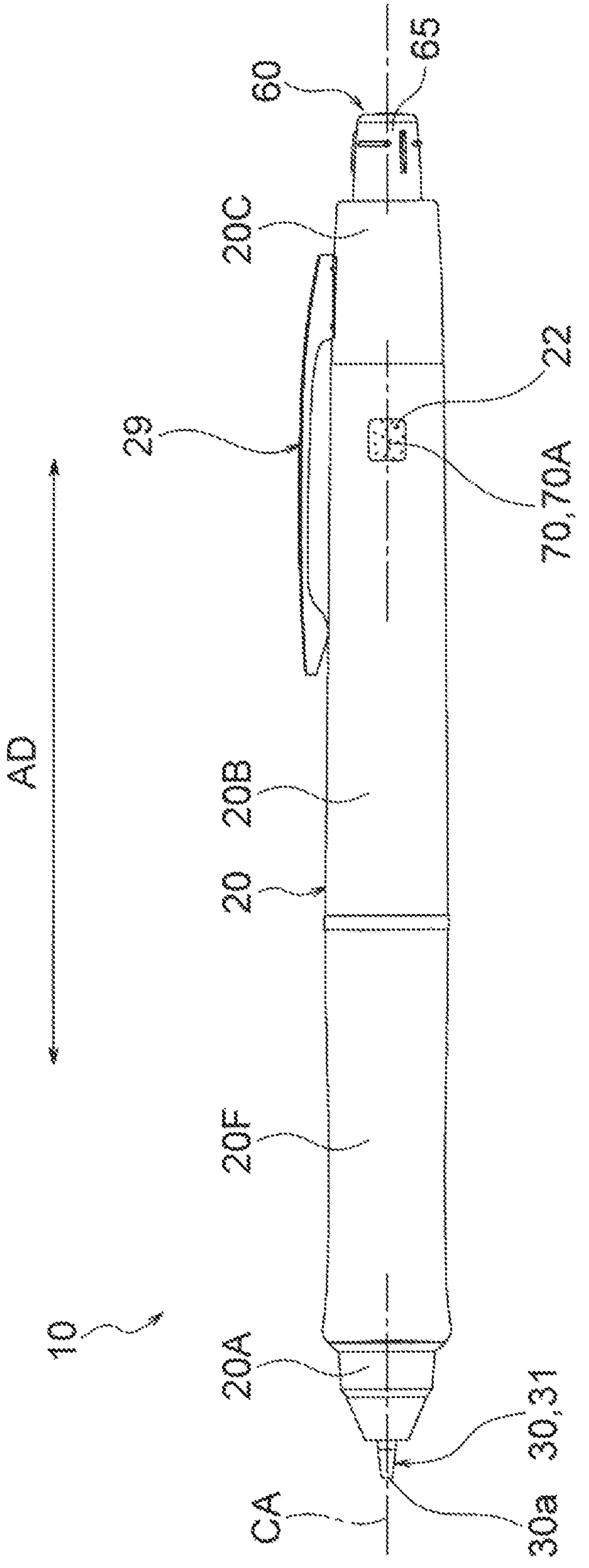
FIG. 1 is a view for describing an embodiment of the present invention, which is a plan view showing a specific example of a mechanical pencil storing spare lead.

An embodiment of the present invention will be described herebelow with reference to a specific example shown in the drawings.

FIGS. 1 to 14 are views for describing an embodiment of the present invention, showing a specific example of a mechanical pencil according to the embodiment. FIGS. 1 to 4 are a plan view, a sectional view or a partial sectional view respectively showing a mechanical pencil storing spare lead in a lead storage space, which is in a non-knock state.

A mechanical pencil 10 according to this embodiment has a shaft tube (shaft cylinder) 20, a ferrule unit 30, a lead holding unit 40, and an indication body 70. The shaft tube 20 is a tubular member (cylindrical member) having openings in an axial direction AD. The ferrule unit 30 is supported by the shaft tube 20 to protrude forward from a front end opening of the shaft tube 20. The lead holding unit 40 is held in the shaft tube 20 movably in the axial direction AD. The lead holding unit 40 can hold single lead LE. The lead holding unit 40 relatively moves in the axial direction AD with respect to the ferrule unit 30 to eject the lead LE toward the ferrule unit 30. The mechanical pencil 10 has a lead storage space S for storing spare lead SLE as replacement lead to be supplied to the lead holding unit 40. The indication body 70 delimits the lead storage space S from rearward.

Further, the illustrated mechanical pencil 10 has an intermediate tube member (intermediate cylinder member) 50, a knock unit 60, and a clip 29 which are held by the shaft tube 20. The intermediate tube member 50 is located rearward the lead holding unit 40 in the axial direction AD. The intermediate tube member 50 is provided in the shaft tube 20 movably in the axial direction AD. The knock unit 60 is a part to which a user inputs an operation when he/she relatively moves the lead holding unit 40 with respect to the ferrule unit 30 in the axial direction AD. In the illustrated example, the knock unit 60 is inserted in the shaft tube 20 from a rear end opening of the shaft tube 20. In the illustrated example, the indication body 70 is held by the knock unit 60 movably in the axial direction AD. Note that the illustrated mechanical pencil 10 is a mere example. The knock unit 60 may be a member laterally exposed from an intermediate part of the shaft tube 20 in the axial direction AD. In addition, the indication body 70 may be held, not by the knock unit 60, but by the shaft tube 20, or may be held by the intermediate tube member 50.

In this specification, a direction along which a center axis line CA of the shaft tube 20 extends (longitudinal direction, up and down direction in longitudinal sectional view) is referred to as axial direction AD (axially). In the illustrated example, the center axis line CA of the shaft tube 20 coincides with a center axis line of the lead LE held by the lead holding unit 40. A direction orthogonal to the axial direction AD is referred to as radial direction (diametrical direction), and a round direction about the axial direction AD is referred to as circumferential direction (circumferentially). Further, a side close to a surface on which something is written, such as a sheet of paper, is referred to as front side (front, forward), and a side apart from the surface is referred to as rear side (rear, rearward). In addition, an outside in the radial direction is a side apart from the center axis line CA, and an inside in the radial direction is a side close to the center axis line CA. Namely, the upper side in the longitudinal sectional view, i.e., the side of the knock unit 60 is expressed as rearward, and the lower side in the longitudinal sectional view, i.e., the side of the front end opening 30*a* is expressed as forward.

Herebelow, respective constituent elements constituting the mechanical pencil 10 will be described.

Figure 2:
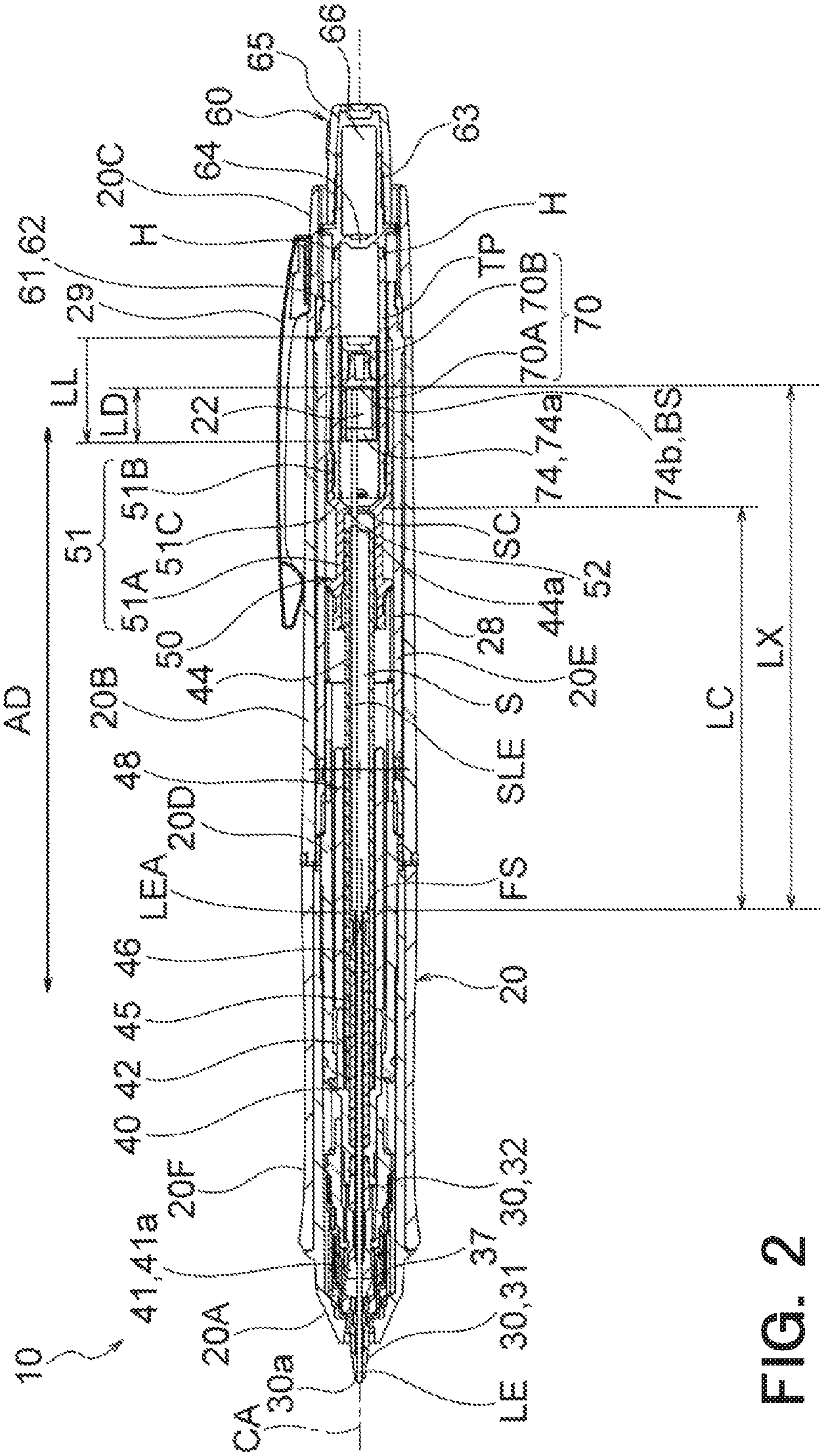
FIG. 2 is a longitudinal sectional view showing the mechanical pencil of FIG. 1.

As described above, the shaft tube 20 is a cylindrical member opened to both sides in the axial direction AD, i.e., opened forward and rearward. As shown in FIG. 2, the shaft tube 20 has a front shaft tube 20A, an intermediate shaft tube 20B, a rear shaft tube 20C, a front inside shaft tube 20D, a rear inside shaft tube 20E, and a cover member 20F. A rear end portion of the front inside shaft tube 20D and a front end portion of the rear inside shaft tube 20E are fixed by fitting or screwing. The intermediate shaft tube 20B is fixed to the rear end portion of the front inside shaft tube 20D and a front portion and an intermediate portion of the rear inside shaft tube 20E from radially outside. The rear shaft tube 20C is fixed to a rear end portion of the rear inside shaft tube 20E from radially outside. Screws that are screwed to each other are formed on an inner surface of the rear end portion of the front shaft tube 20A and an inner surface of the intermediate portion of the front inside shaft tube 20D. The front shaft tube 20A and the front inside shaft tube 20D are detachable by using the screws. The front shaft tube 20A, the intermediate shaft tube 20B, the rear shaft tube 20C, the front inside shaft tube 20D, and the rear inside shaft tube 20E may be fabricated as resin moldings, for example. The cover member 20F is fixed to the front shaft tube 20A from radially outside. The cover member 20F serves as a grip of the mechanical pencil 10, and is made of rubber or resin, for example. The front shaft tube 20A forms a front end opening of the shaft tube 20, and the rear shaft tube 20C forms a rear end opening of the shaft tube 20. The clip 29 is fixed on the rear shaft tube 20C of the shaft tube 20.

Next, the ferrule unit 30 is described. As well shown in FIG. 3, a major part of the ferrule unit 30 is located in the shaft tube 20. However, a front end portion of the ferrule unit 30 protrudes forward from the front end opening of the shaft tube 20.

In the illustrated example, the ferrule unit 30 is not fixed to the shaft tube 20 in order to ensure a lead protection function described below. The ferrule unit 30 is located in the shaft tube 20 movably in the axial direction AD. A ferrule pressing member 38 is provided between the ferrule unit 30 and the shaft tube 20. The ferrule pressing member 38 presses the ferrule unit 30 forward with respect to the shaft tube 20. The ferrule pressing member 38 is located in the shaft tube 20. The ferrule pressing member 38 is formed of a compression spring or the like, for example, and is compressed between a front end surface of the front inside shaft tube 20D and the ferrule unit 30.

Note that an inner width (inside dimension, internal diameter in illustrated example) of the shaft tube 20 tapers generally forward at its front end portion. Similarly, an outer width (outside dimension, external diameter in illustrated example) tapers generally forward. As a result, the ferrule unit 30 cannot escape forward from the inside of the shaft tube 20. In addition, the ferrule unit 30 is also relatively movable with respect to the shaft tube 20 in the radial direction.

Figure 3:
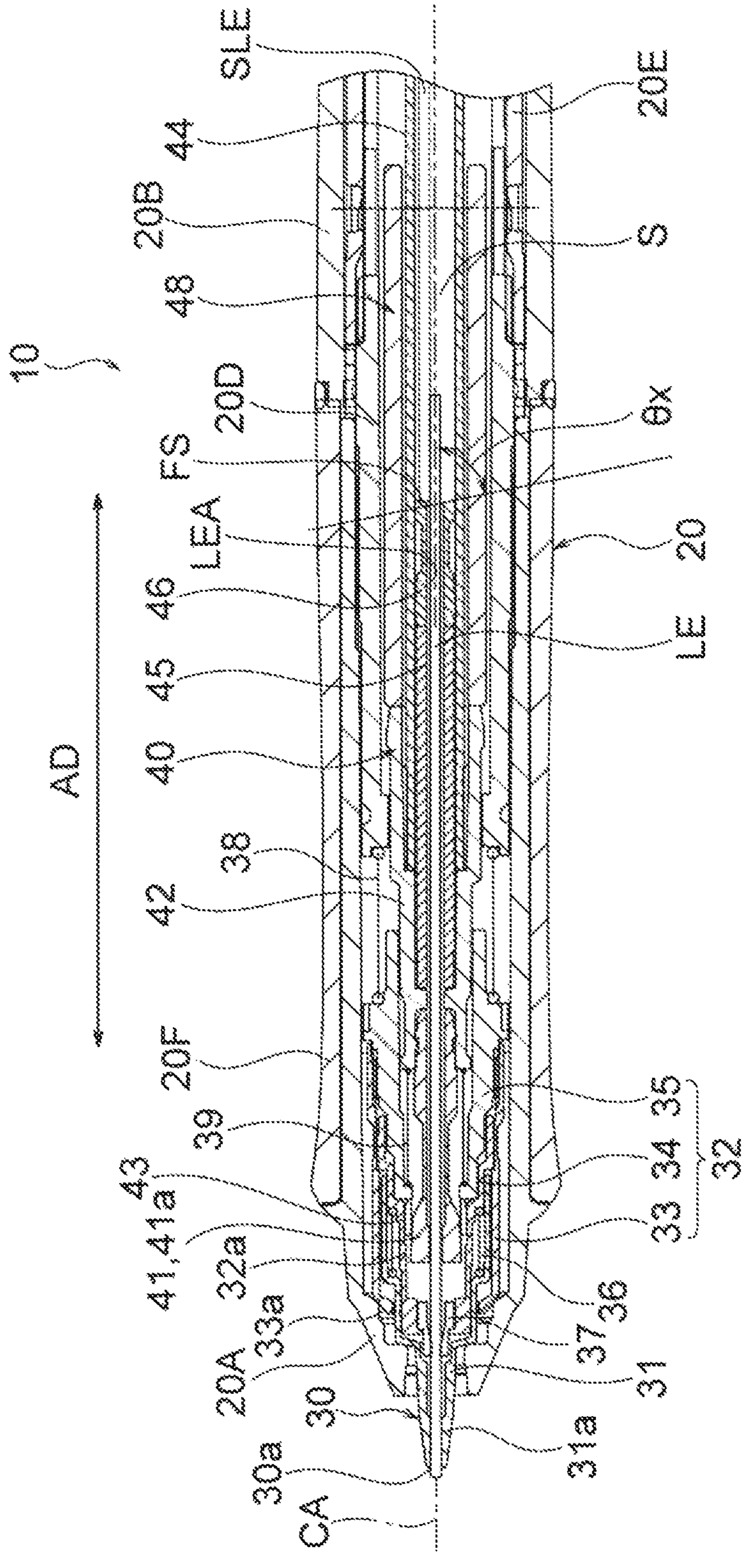
FIG. 3 is a partial sectional view showing a front portion of the mechanical pencil of FIG. 1.

As shown in FIG. 3, the ferrule unit 30 has a ferrule distal end member 31 protruding forward from the shaft tube 20, a ferrule proximal end member 32 holding the ferrule distal end member 32, and a distal end pressing member 36 provided between the ferrule distal end member 31 and the ferrule proximal end member 32. The ferrule distal end member 31 protrudes forward from the shaft tube 20. The ferrule distal end member 31 is a tubular part (cylindrical part) which tapers axially forward. A distal end portion of the ferrule distal end member 31 has a distal tubular part (distal cylindrical part) 31*a* which has an internal diameter corresponding to single lead LE to support single lead LE. The distal tubular part 31*a* forms the front end opening 30*a* of the ferrule unit 30.

On the other hand, the ferrule proximal end member 32 holds the ferrule distal end member 31 movably in the axial direction AD. As shown in FIG. 3, the illustrated ferrule proximal end member 32 has a first proximal end member 33, a second proximal end member 34, and a third proximal end member 35. The first proximal end member 33 is located radially outside the second proximal end member 34. A rear end portion of the first proximal end member 33 is fixed to the second proximal end member 34. At a front portion of the second proximal end member 34, the first proximal end member 33 and the second proximal end member 34 are radially spaced from each other. A rear portion of the ferrule distal end member 31 is located in this space. In addition, the second proximal end member 34 holds a lead holding member 37. The lead holding member 37 is a rubber member having a through hole, and can hold the lead LE passing therethrough.

The ferrule distal end member 31 is relatively movable with respect to the first proximal end member 33 and the second proximal end member 34 in the axial direction AD. A front end portion of the first proximal end member 33 tapers forward. Thus, the ferrule distal end member 31 protruding forward from the first proximal end member 33 and the second proximal end member 34 is prevented from escaping forward from the first proximal end member 33 and the second proximal end member 34. In addition, the distal end pressing member 36 is located between the ferrule distal end member 31 and the second proximal end member 34 of the ferrule proximal end member 32. The distal end pressing member 36 presses the ferrule distal end member 31 forward with respect to the second proximal end member 34. The distal end pressing member 36 is formed of a compression spring, for example. The first proximal end member 33 and the second proximal end member 34 are formed as metal members, for example.

A rear portion of the first proximal end member 33 and a rear end portion of the second proximal end member 34 are located radially outside a front portion of the third proximal end member 35. The rear portion of the first proximal end member 33 and the rear end portion of the second proximal end member 34 are fixed to the front portion of the third proximal end member 35. The second proximal end member 34 and the third proximal end member 35 are formed as tubular members (cylindrical members) and accommodate a front end portion of the lead holding unit 40. In the illustrated example, a chuck pressing member 39 is provided between the lead holding unit 40 and the third proximal end member 35 of the ferrule proximal end member 32. The chuck pressing member 39 presses the ferrule unit 30 and the lead holding unit 40 such that they are separated from each other in the axial direction AD. The chuck pressing member 39 is formed of a compression spring, for example. The third proximal end member 35 may be fabricated as a resin molding.

Next, the lead holding unit 40 is described. The lead holding unit 40 holds the lead LE. The lead holding unit 40 is movable in the shaft tube 20 in the axial direction AD. When the lead holding unit 40 comes close to the ferrule unit 30 against the pressing force of the chuck pressing member 39, the lead holding unit 40 ejects to some extent the lead LE held by the lead holding unit toward the ferrule unit 30. In this specification, a user's operation for moving forward the lead holding unit 40 toward the ferrule unit 30 is referred to as knock operation.

As shown in FIG. 3, the illustrated holding unit 40 has a chuck 41, a chuck holding member 42, a fastener 43, a lead storage tube (lead storage cylinder) 44, an inside auxiliary tube (inside auxiliary cylinder) 45, and an inside guide member 46. The chuck 41 releasably holds the lead LE. The chuck 41 has a plurality of divided head parts 41*a*, e.g., three head parts 41*a*. The chuck 41 is fixed, at its rear end portion, to the front end portion of the chuck holding member 42. The head parts 41*a* pass through the annularly formed fastener 43. The head parts 41*a* are formed such that, at their front portions, they are separated part from each other. When the fastener 43 moves forward, the head parts 41*a* come close to each other, at their front portions, so as to hold the lead LE. When the fastener 43 moves rearward, the head parts 41*a* move away from each other, at their front portions, so as to release the lead LE.

The head parts 41*a* and the fastener 43 of the chuck 41 are located in the ferrule proximal end member 32 of the ferrule unit 30. The ferrule proximal end member 32 has, on an inner surface thereof, a restriction step 32*a* that restricts the forward movement of the fastener 43. When the lead holding unit 40 moves forward with respect to the ferrule unit 30, the lead LE held by the chuck 41 also moves forward until the fastener 43 is restricted from moving forward by the restriction step 32*a*. Since the lead holding unit 40 continues to further move forward with the forward movement of the fastener 43 being restricted by the restriction step 32*a*, the head parts 41*a* move away from each other so as to release the lead LE. In this way, the lead LE can be ejected by moving forward the lead holding unit 40 with respect to the ferrule unit 30.

The chuck holding member 42 is a tubular member (cylindrical member). The chuck holding member 42 holds the lead storage tube 44. The lead storage tube 44 is a cylindrical member. A front end portion of the lead storage tube 44 is inserted in the chuck holding member 42 from a rear opening of the chuck holding member 42. The lead storage tube 44 extends rearward from the chuck holding member 42. A rear end of the lead storage tube 44 is inserted in the intermediate tube member 50 described below. The lead storage tube 44, together with the intermediate tube member 50 and the indication body 70 described below, defines the lead storage space S.

The inside auxiliary tube 45 and the inside guide member 46 are inserted in the lead storage tube 44. The inside auxiliary tube 45 and the inside guide member 46 are both formed cylindrically. The inside auxiliary tube 45 and the inside guide member 46 form a lead ejection aperture LEA in communication with the chuck 41. The lead ejection aperture LEA has an internal diameter (inside dimension)

allowing single lead LE passing therethrough at one time. The inside guide member 46 adjoin the inside auxiliary tube 45 from rearward. The inside guide member 46 forms a front wall surface FS which delimits the lead storage space S from the front side in the axial direction AD. The lead ejection aperture LEA opens, in the front wall surface FS, axially rearward.

As shown in FIG. 3, the front wall surface FS is inclined rearward in the axial direction AD as it separates away from the lead ejection aperture LEA along a direction perpendicular to the axial direction AD, i.e., radially outward. Such an inclination of the front wall surface FS enables space lead SLE in the lead storage space S to be guided to the lead ejection aperture LEA. The front wall surface FS preferably has rotational symmetry around the center axis line CA. In particular, the front wall surface FS more preferably has a shape of a side surface of a cone, and has rotational symmetry at an optional rotation angle. The rotation symmetry of the front wall surface FS allows smooth guiding of the lead LE stored in the lead storage space S, and effectively prevents the spare lead SLE from being non-uniformly located in the lead storage space S.

Note that, in this embodiment, in a writing state where the front of the mechanical pencil 10 is directed vertically downward, the spare lead SLE in the lead storage space S is pushed forward by the weight of the indication body 70. Thus, it may become difficult for the lead LE to smoothly eject, because the spare lead SLE enters like a wedge between the lead LE held by the chuck 41 with its rear end protruding in the lead storage space S and the front wall surface FS. In consideration of this point, an inclination angle θx of the front wall surface FS with respect to the axial direction AD is preferably not excessively small, unlike a conventional mechanical pencil. From a viewpoint of making smooth the ejection of the lead LE, the inclination angle θx is preferably more than 45° and less than 85°, more preferably more than 60° and less than 85°, further preferably more than 70° and less than 85°, most preferably more than 75° and less than 85°.

Since the inside auxiliary tube 45 and the inside guide member 46 are provided in the lead storage tube 44, the lead ejection aperture LEA having an internal diameter corresponding to the diameter of the lead LE is defined. The inside auxiliary tube 45 and the inside guide member 46 ensure that the lead ejection hole LEA through which only single lead LE can pass is elongated. Such a lead ejection aperture LEA can effectively avoid the lead LE held by the lead holing unit 40 from breaking. In addition, when the lead LE held by the head holding unit 40 is retracted, and also when lead LE is inserted from the front end opening 30*a*, braking of the lead LE can be effectively avoided.

By way of example, the chuck 41, the fastener 43, and the inside guide member 46 are fabricated by a metal, for example, brass, and the chuck holding member 42, the lead storage tube 44 and the inside auxiliary tube 45 are fabricated as resin moldings. However, unlike the illustrated example, the inside auxiliary tube 45 may be formed with one or more of the chuck holding member 42, the lead storage tube 44 and the inside guide member 46 as one piece, and may be formed integrally therewith using a resin, for example. The inside guide member 46 may be formed with one or more of the chuck holding member 42, the lead storage tube 44 and the inside auxiliary tube 45 as one piece, and may be formed integrally therewith using a resin, for example. The chuck holding member 42 may be formed with one or more of the lead storage tube 44, the inside auxiliary tube 45 and the inside guide member 46 as one piece, and may be formed integrally therewith using a resin, for example. The lead storage tube 44 may be formed with one or more of the chuck holding member 42, the inside auxiliary tube 45 and the inside guide member 46 as one piece, and may be formed integrally therewith using a resin, for example.

Figure 4:
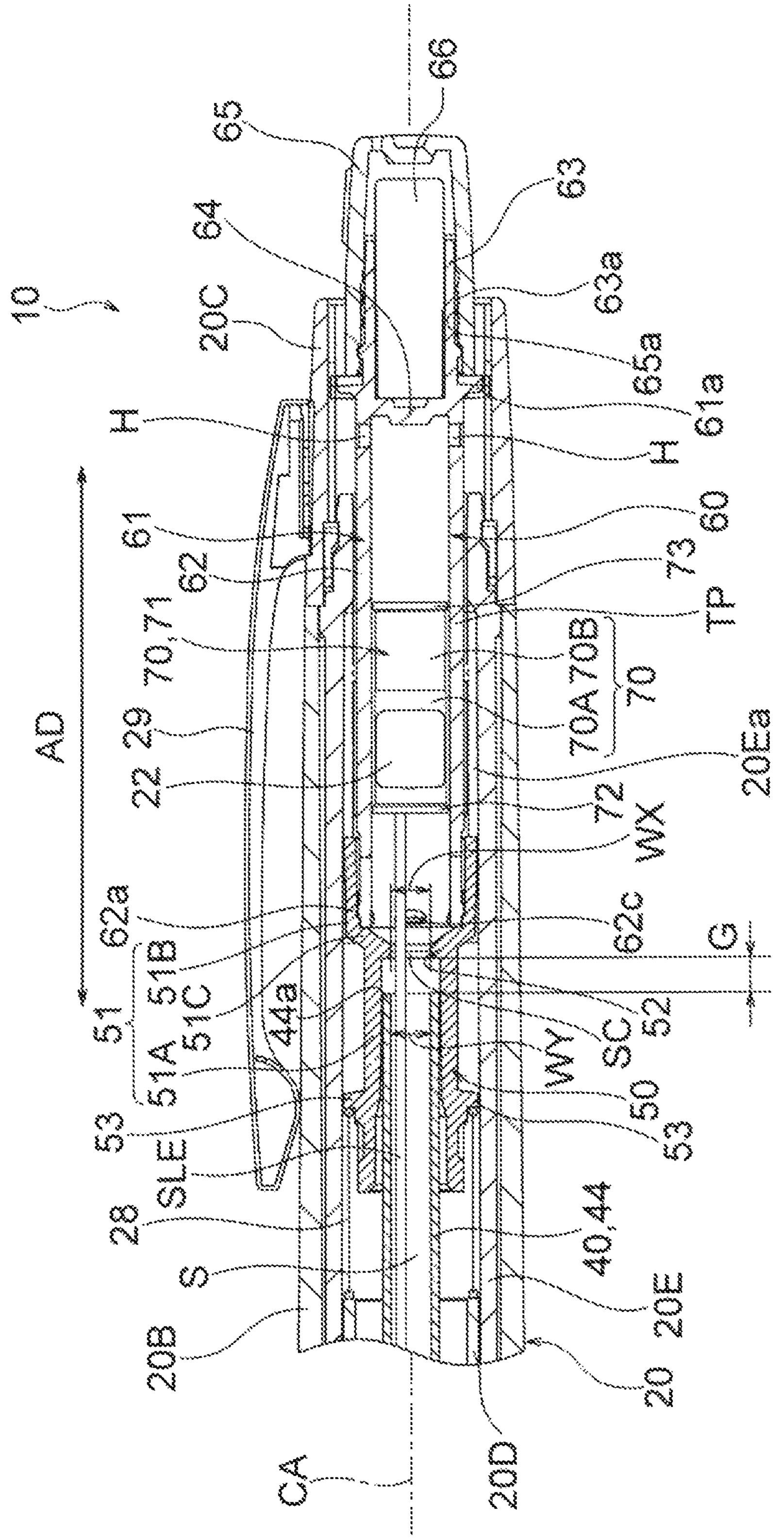
FIG. 4 is a partial sectional view showing a rear portion of the mechanical pencil of FIG. 1.

Next, the intermediate tube member 50 is described. Returning to FIG. 2, the intermediate tube member 50 is held in the shaft tube 20 movably in the axial direction AD. An intermediate pressing member 28 is provided between the intermediate tube member 50 and the shaft tube 20. The intermediate pressing member 28 is supported, at its front end, on a rear end surface of the front inside shaft tube 20D. The intermediate pressing member 28 presses the intermediate tube member 50 rearward with respect to the shaft tube 20. The intermediate pressing member 28 is formed of, for example, a compression spring. On the other hand, as shown in FIG. 4, the rear inside shaft tube 20E is provided with a projection 20Ea. Since the intermediate tube member 50 is in contact with the projection 20Ea, a rear end of the range where the intermediate tube member 50 can move in the shaft tube 20 is defined.

As shown in FIG. 4, the intermediate tube member 50 has a generally cylindrical shape. The intermediate tube member 50 forms an intermediate portion of the lead storage space S in the axial direction AD. The intermediate tube member 50 has a tubular body part (cylindrical body part)51, an inner rib 52 protruding from an inner surface of the tubular body part 51, and a pressing receiving flange 53 protruding from an outer surface of the tubular body part 51. The tubular body part 51, the inner rib 52, and the pressing receiving flange 53 may be integrally molded as a resin molding, for example. The pressing receiving flange 53 receives a rear end of the intermediate pressing member 28. Namely, the intermediate pressing member 28 is compressed between the front inside shaft tube 20D of the shaft tube 20 and the pressing receiving flange 53 of the intermediate tube member 50.

The tubular body part 51 has a front tube part (front cylinder part) 51A, a rear tube part (rear cylinder part) 51B, and an intermediate tapering part 51C. The front tube part 51A is located forward the rear tube part 51B and the intermediate tapering part 51C in the axial direction AD. Namely, the front tube part 51A is located at the frontmost of the intermediate tube member 50. The pressing receiving flange 53 is provided on the outer surface of the front tube part 51A. The rear cylinder part 51B is located rearward the front tube part 51A and the intermediate tapering part 51C in the axial direction AD. Namely, the rear tube part 51B is located at the rearmost of the intermediate tube member 50. The intermediate tapering part 51C is located between the front tube part 51A and the rear tube part 51B in the axial direction AD.

An outer width (external diameter) and an inner width (internal diameter) of the front tube part 51A are smaller than an outer width (external diameter) and an inner width (internal diameter) of the rear tube part 51B, respectively. The intermediate tapering part 51C has a shape tapering forward. The inner rib 52 is located on an extension of the intermediate tapering part 51C. The inner rib 52 is formed annularly.

As shown in FIG. 2, a rear end portion of the lead storage tube 44 of the lead holding unit 40 is inserted in the front cylinder part 51A. The rear end portion of the lead storage tube 44 is relatively movable in the front cylinder part 51 with respect to the front tube part 51A in the axial direction AD. Upon the knock operation, the intermediate tube member 50 moves forward, so that the inner rib 52 comes into contact with a rear end surface 44*a* of the lead storage tube 44. When the intermediate tube member 50 further moves forward, the lead holding unit 40 including the lead storage tube 44 moves forward in synch with the intermediate tube member 50 so as to come close to the ferrule unit 30 in the axial direction AD.

On the other hand, a front end portion of the knock unit 60 is inserted in the rear tube part 51B. A front end of the knock unit is adjacent to the intermediate tapering part 51C of the intermediate tube member 50. Upon the knock operation, the intermediate tube member 50 also moves forward in synch with the forward movement of the knock unit 60.

As described above, the intermediate tube member 50 defines the lead storage space S. The inner rib 52 of the intermediate tube member 50 forms a reduced width part SC of the lead storage space S. The reduced width part SC is located at an intermediate part of the lead storage space S in the axial direction AD to locally narrow the width of the lead storage space S along the radial direction orthogonal to the axial direction AD. Such a lead storage space S can effectively prevent the spare lead SLE stored in the lead storage space S from spreading in the rear of the lead storage space S in a direction (radial direction) perpendicular to the axial direction. Thus, the spare lead SLE stored in the lead storage space S can be effectively prevented from being largely inclined with respect to the axial direction.

The spare lead SLE largely inclined in the lead storage space S is likely to enter like a wedge between the lead LE held by the chuck 41 with its rear end protruding in the lead storage space S and the front wall surface FS. Thus, when the spare lead SLE in the lead storage space S is largely inclined, smooth ejection of the lead LE held by the chuck 41 may be blocked, as described above. In order to prevent this, the reduced width part SC is provided by the inner rib 52. This can lessen the inclination of the spare lead SLE in the lead storage space S and can make smooth the ejection of the lead LE from the lead holding unit 40. In addition, since spreading of rear ends of the spare lead SLE is restricted, the knock unit 60 can be easily inserted into the intermediate tube member 50 from rearward.

Particularly in the illustrated intermediate tube member 50, as shown in FIG. 2, a length LC along the axial direction AD from the front end of the lead storage space S up to the reduced width part SC formed by the inner rib 52 is shorter than a length LX of the spare lead SLE. In addition, the length LC is longer than half of the length LX of the spare lead SLE. Particularly in the illustrated example, the length LC is longer than ⅔ of the length LX of the spare lead SLE, and even longer than ¾ of the length LX of the spare lead SLE. By adjusting the position of the reduced width part SC in the axial direction AD in this manner, the spare lead SLE stored in the lead storage space S can be effectively prevented from being largely inclined with respect to the axial direction AD.

The length LX of the spare lead SLE referred to in this specification means a length of the spare lead SLE before use. Typically, according to the JIS standard (JIS S6005 (2019) Lead for Mechanical Pencil), 60 mm can be adopted as the length LX of the spare lead SLE having a diameter of 0.2 mm or more and 1.4 mm or less, and 130 mm can be adopted as the length LX of the spare lead SLE having a diameter of 2.0 mm. In addition, in consideration of a tolerance of lead length allowed by the JIS standard, 61 mm can be adopted as the length LX of the spare lead SLE having a diameter of 0.2 mm or more and 1.4 mm or less, and 131 mm can be adopted as the length LX of the spare lead SLE having a diameter of 2.0 mm.

As can be well shown in FIG. 4, an inner width (internal diameter, inside dimension) WX of the intermediate tube member 50 at the position where the inner rib 52 is provided is smaller than an inner width (internal diameter, inside dimension) WY of the lead storage tube 44. Such an example can effectively suppress the spare lead SLE from being largely inclined in the lead storage space S with respect to the axial direction AD.

However, the present invention is not limited to the illustrated example. The inner width WX of the intermediate tube member 50 at the position where the inner rib 52 is provided may be equal to the inner width WY of the lead storage tube 44. Such an example can effectively prevent jam of the spare lead SLE in the reduced width part SC of the lead storage space S. In addition, when spare lead SLE is inserted into the lead storage space S from the front end opening 30*a* of the mechanical pencil 10, the spare lead SLE can be effectively prevented from being caught by the inner rib 52 forming the reduced width part SC. Moreover, the inner width WX of the intermediate tube member 50 at the position where the inner rib 52 is provided may be larger than the inner width WY of the lead storage tube 44. This example allows that the lead holding unit 40 can be stably moved axially forward through the intermediate tube member 50.

Figure 5:
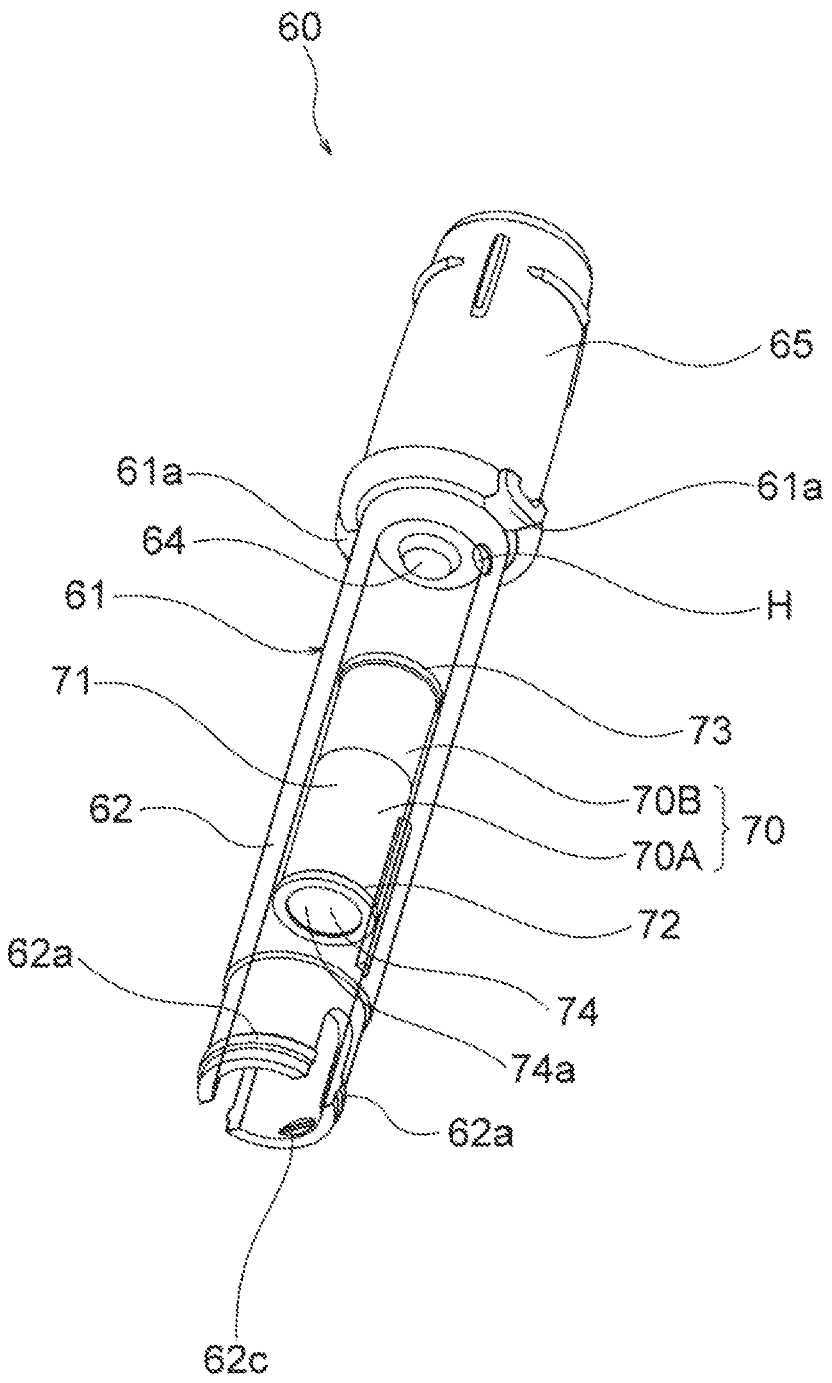
FIG. 5 is a perspective view showing a knock unit of the mechanical pencil of FIG. 1.

Next, the knock unit 60 is described. The knock unit 60 is a part which is subjected to an action by a user of the mechanical pencil 10 when he/she carries out the knock operation. The knock unit 60 is inserted in the shaft tube 20 from the rear end opening of the shaft tube 20. A distal end portion of the knock unit 60 inserted in the shaft tube 20 is inserted in the rear tube part 51B of the intermediate tube member 50. The knock unit 60 is fitted in the intermediate tube member 50 and is held by the knock unit 60. As well shown in FIG. 5, the knock unit 60 holds the indication body 70 movably in the axial direction AD. Namely, in the illustrated example, the knock unit 60 includes a tubular portion TP which accommodates the indication body 70 movably in the axial direction AD. The indication body 70 is inserted in the intermediate tube member 50 with this tubular portion TP. The knock unit 60 and the indication body 70 partly form the lead storage space S. FIG. 5 is a perspective view showing the knock unit 60.

In the illustrated example, the knock unit 60 has a knock member 61, a cap member 65, and an accessory 66. As well shown in FIG. 4, the knock member 61 has a front tubular part (front cylindrical part) 62, a rear tubular part (rear cylindrical part) 63, and a partition wall part 64. The knock member 61 is integrally molded as a resin molding, for example. The front tubular part 62 is located forward the rear tubular part 63 and the partition wall part 64. The front tubular part 62 forms a frontmost part of the knock member 61. The rear tubular part 63 is located rearward the front tubular part 62 and the partition wall part 64. The rear tubular part 63 forms a rearmost part of the knock emmer 61. The front tubular part 62 and the rear tubular part 63 are formed as tubular parts.

The knock member 61 of the knock unit 60 further has a lateral protruding part 61*a* protruding radially outward from a position between the front tubular part 62 and the rear tubular part 63. In the illustrated example, a pair of lateral protruding parts are located at positions opposite to each other, with their phases being shifted at 180°. The lateral protruding parts 61*a* are engaged with engagement portions formed in the inner surface of the shaft tube 20, and thus are used for positioning the knock unit 60 and the shaft tube 20 in the circumferential direction.

The partition wall part 64 is located between the front tubular part 62 and the rear tubular part 63 in the axial direction AD. The partition wall part 64 extends in a direction non-parallel to the axial direction AD to divide an inside of the knock member 61.

When combined with the partition wall part 64, the front tubular part 62 forms a substantially tubular portion with a closed rear end. The indication body 70 is accommodated in the front tubular part 62. The indication body 70 is prevented from escaping forward from the front tubular part 62. Namely, the front tubular part 62 forms the tubular portion TP that holds the indication body 70 movably in the axial direction AD. The front tubular part 62 is transparent such that the indication body 70 is visible. Here, transparent includes not only colorless transparent but also colored transparent.

As shown in FIG. 5, a fitting convex part 62*a* is provided on an outer surface of a front end portion of the front tubular part 62. The fitting convex part 62*a* is fitted in the rear tube part 51B of the intermediate tube member 50, and thus is used for fixing of the knock unit 60 and the intermediate tube member 50.

As shown in FIG. 4, when combined with the partition wall part 64, the rear tubular part 63 has a substantially tubular portion with a closed front end. The rear tubular part 63, together with the partition wall part 64, forms an accommodation space of the accessory 66. The accessary 66 may typically be an eraser for correcting typographical errors. Other examples of the accessory 66 may include a ballpoint pen, a marking pen, a correction tape, a touch pen for a smart phone or table device and so on. Further, when the mechanical pen 10 includes solid lead which contains a reversible thermochromic microcapsule pigment and is capable of forming a reversible thermochromic handwriting by writing, the accessory 66 may be a friction member capable of changing or erasing the color of the handwriting by the solid lead by heat friction with a sheet of paper.

As shown in FIG. 4, the cap member 65 is a member which covers the rear tubular part 63 from rearward. The cap member 65 can close the accommodation space of the accessory 66. An inner screw portion 65*a* is formed in an inner surface of the cap member 65. The inner screw portion 65*a* is to be meshed with an outer screw portion 63*a* formed on an outer surface of the rear tubular part 63. Namely, in the illustrated example, the cap member 65 can be detached from the knock member 61 by relatively rotating circumferentially the cap member 65 with respect to the knock member 61. At this time, since the lateral protruding part 61*a* is engaged with the engagement portion formed in the inner surface of the shaft tube 20, the rotation of the knock member 61 with respect to the shaft tube 20 is restricted. Thus, a user can easily attach and detach the cap member 65 by grasping the shaft tube 20 with one hand and operating the cap member 65 with the other hand.

Next, the indication body 70 is described. As shown in FIG. 5, the indication body 70 has a cylindrical outer shape. The indication body 70 is accommodated in the front tubular part 62 of the knock member 61 such that the indication body 70 is movable with respect to the knock member 61 within a certain range along the axial direction AD. In the illustrated example, the indication body 70 is movable between a frontmost position which is most forward and is shown by solid lines in FIG. 7, and a rearmost position which is most rearward and is shown by two-dot chain lines in FIG. 7. To be specific, at the frontmost position, the indication body 70 is in contact with a restriction convex portion 62*c* provided on the inner surface of the front tubular part 62, so that its forward movement is restricted. On the other hand, at the rearmost position, the indication body 70 is in contact with the partition wall part 64, so that its rearward movement is restricted.

The indication body 70 delimits the lead storage space S from rearward. On the assumption that writing is performed such that the front of the mechanical pencil 10 is positioned vertically downward, the position of the indication body 70 along the axial direction AD changes depending on whether there is spare lead SLE in the lead storage space S. In the illustrated example, two conditions are satisfied. Namely, one is that a shortest length LSmin (see FIG. 7) of the lead storage space S with the indication body 70 having moved to the frontmost along the axial direction AD is shorter than the length LX of the spare lead SLE. The other condition is that a longest length LSMAX (see FIG. 7) of the lead storage space S with the indication body 70 having moved to the rear most along the axial direction AD is longer than the length L X of the spare lead SLE.

The indication body 70 located at least a predetermined position in the axial direction AD can be seen from outside the shaft tube 20. In particular, the position of the indication body 70 in the axial direction AD can be checked from outside the shaft tube 20. In the mechanical pencil 10 in this embodiment, whether there is spare lead SLE in the lead storage space S can be determined by checking the position of the indication body 70 in the axial direction AD.

As shown in FIG. 5, the indication body 70 has a cylindrical outer shape. In order to easily check the position of the indication body 70 in the axial direction AD, an indication object is preferably formed on a cylindrical outer circumferential surface (side surface) of the indication body 70. In this case, instead of determining whether there is spare lead SLE by perceiving the position of the indication body 70, the indication body 70 can directly show whether there is spare lead SLE. Examples of the indication object to be indicated on the indication body 70 may include an illustration (image) such as a figure, a pattern, a design, a color, a paint, a picture and a character, a letter, a mark, a numeral and so on. For example, the indication body 70 may indicate that there is no spare lead SLE by showing a first color (e.g., red), and may indicate that there is spare lead SLE by showing a second color (e.g., black).

In the illustrated example, a window part 22 allowing the inside of the shaft tube 20 to be seen is provided on the shaft tube 20. As can be understood from FIG. 1, the shaft tube 20 is transparent in a region forming the window part 22, and opaque in a region other than the window part 22. For example, the region of the shaft tube 20 other than the region forming the window part 22 can be made opaque by printing or by applying a decorative film to the region. Such processing to make opaque a region may be performed any of the inner surfaces and outer surfaces of the front shaft tube 20A, the intermediate shaft tube 20B, the rear shaft tube 20C, the front inside shaft tube 20D, and the rear inside shaft tube 20E. In addition, the region forming the window part 22 may be formed by a hole provided in the shaft tube 20, or by a region of the shaft tube 20, which is not processed to be opaque.

For the same of ease of viewing, the window part 22 is shown by, not dotted lines, but solid lines, also in the longitudinal sectional view.

As shown in FIGS. 1 and 2, the window part 22 is located so as to at least partly overlap the region where the indication body 70 is movable in the axial direction AD. In addition, the window part 22 is provided only at a portion in the circumferential direction. Particularly in the illustrated example, a pair of window parts 22 are located at symmetrical positions, in other others, their phases are shifted at 180°. Thus, when the indication body 70 is displaced from the region overlapping the window part 22 in the axial direction AD, the opposite side of the mechanical pencil 10 can be seen through the pair of window parts 22 and the transparent front tubular part 62 of the knock unit 60. With such an operation of the indication body 70, a user can aware of the presence of the indication body 70, which can make more attractive the mechanical pencil 10.

In the illustrated example, the window part 22 is located so as to overlap only a part of the region where the indication body 70 is movable in the axial direction AD. Due to such a location of the window part 22, the region of the indication body 70, which can be seen through the window part 22, can be changed depending on whether there is spare lead SLE, or the indication body 70 can be made invisible through the window part 22 depending on whether there is spare lead SLE. By the change of the state seen through the window part 22, the position of the indication body 70 in the axial direction AD and/or whether there is spare lead SLE in the lead storage space S can be easily determined.

Figure 6:
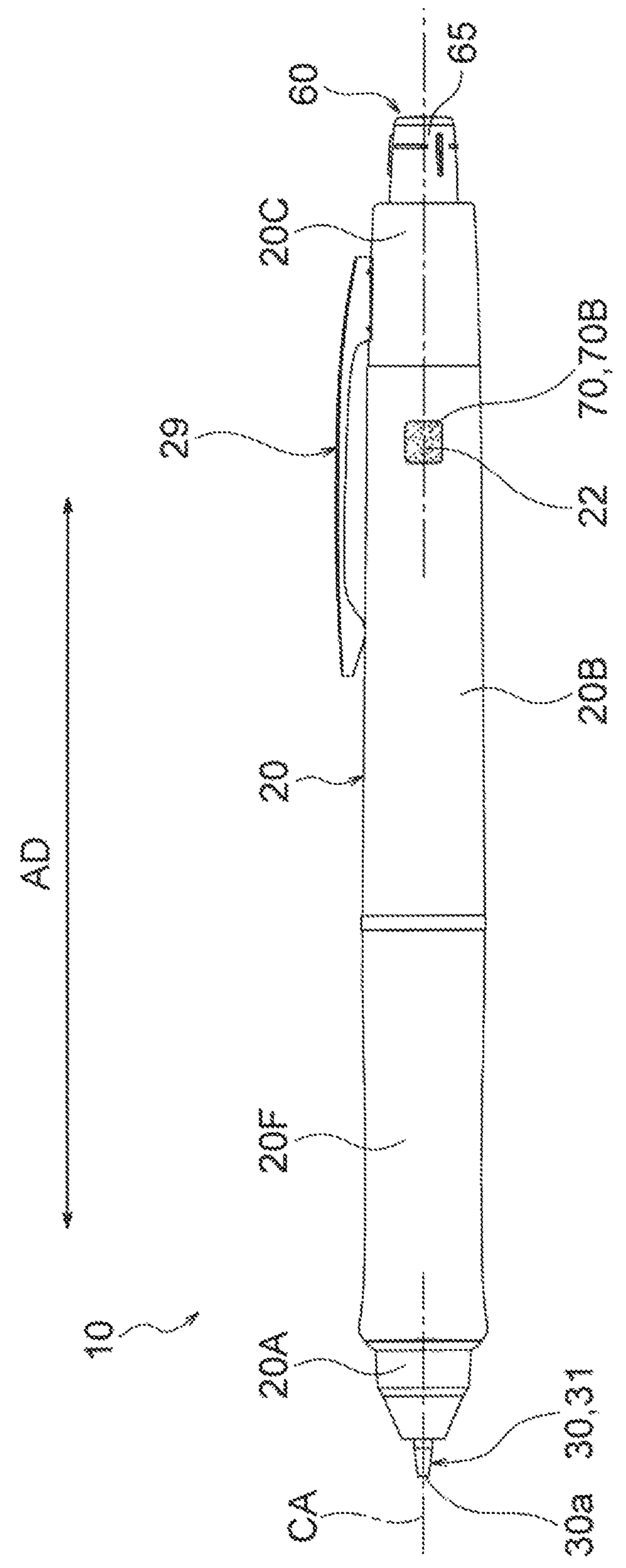
FIG. 6 is a view corresponding to FIG. 1, which is a plan view showing the mechanical pencil of FIG. 1 storing no spare lead.
Figure 7:
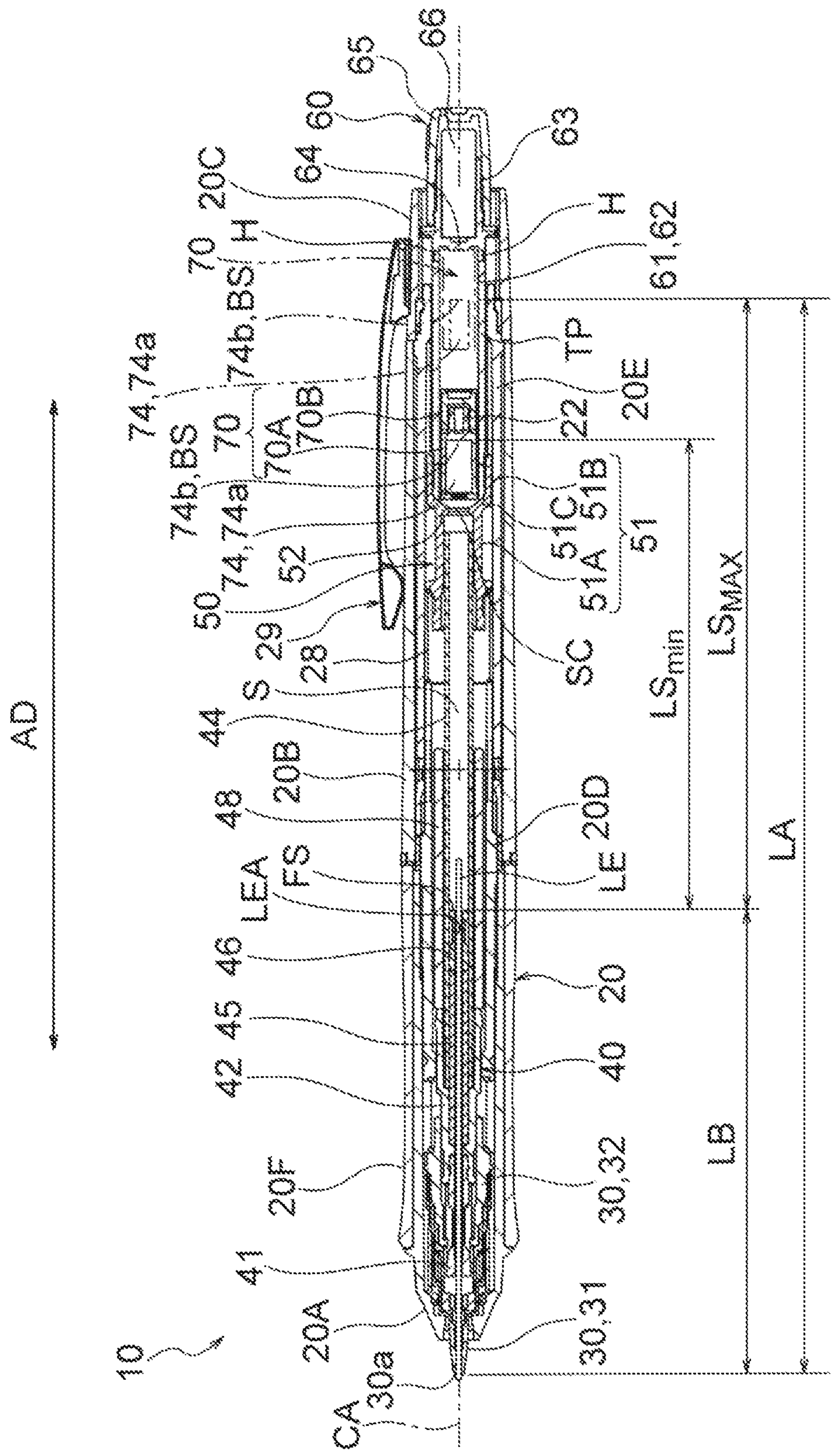
FIG. 7 is a view corresponding to FIG. 2, which is a longitudinal sectional view showing the mechanical pencil of FIG. 6 storing no spare lead.

More specifically, as shown in FIGS. 1 and 2, the indication body 70 supported on the spare lead SLE stored in the lead storage space S can be seen through the window part 22 from outside the shaft tube 20. In addition, the indication body 70, which is located more forward along the axial direction AD than the position at which it is supported on the spare lead SLE stored in the lead storage space S, can be seen from outside the shaft tube 20. Particularly as shown in FIGS. 6 and 7, the indication body 70 located at the frontmost position can be seen from outside the shaft tube 20. Since different parts of the indication body 70 are seen from outside the shaft tube 20 between when the indication body 70 is supported on the spare lead SLE stored in the lead storage space S, and when the indication body 70, which is located more forward along the axial direction AD than the position at which it is supported on the spare lead SLE stored in the lead storage space S, different indications are indicated. Thus, whether there is spare lead SLE can be determined based on the indication of the indication body 70 seen through the window part 22.

However, the present invention is not limited to the illustrated example. Only one window part 22 may be provided. The window part 22 may be formed circumferentially in the circumferential direction. Further, three or more window parts 22 may be provided. When a plurality of window parts 22 are provided, the positions of the window parts 22 in the axial direction AD may correspond to each other, as in the illustrated, example, partly overlap each other, or completely shift from each other.

As shown in FIG. 5, the indication body 70 has a front indication body 70A, and a rear indication body 70B adjacent to the front indication body 70A from rearward in the axial direction AD. The front indication body 70A and the rear indication body 70B are connected to each other by fitting. A length of the front indication body 70A along the axial direction AD is longer than a length of the rear indication body 70B along the axial direction AD. In addition, the indication body 70 is provided with a recess 74 opened forward in the axial direction AD. The recess 74 is formed in the front indication body 70A. The recess 74 is defined by an inside wall surface 74*a* and a bottom wall surface 74*b*. The inside wall surface 74*a* has a cylindrical shape about the center axis line CA. The bottom wall surface 74*b* is formed by a plane non-parallel to the axial direction AD, and is typically a plane perpendicular to the axial direction AD. A depth of the recess 74 along the axial direction AD is equal to or larger than half of the length of the indication body 70 along the axial direction AD.

As shown in FIG. 2, when the spare lead SLE is stored in the lead storage space S, the indication body 70 is supported on the spare lead SLE during writing wherein the front of the mechanical pencil 10 is located vertically downward. At this time, as shown in FIG. 1, the front indication body 70A of the indication body 70 faces the window part 22 of the shaft tube 20 in a direction perpendicular to the axial direction AD. Namely, as shown in FIGS. 1 and 2, the outer surface of the front indication body 70A is seen through the window part 22. On the other hand, with no spare lead SLE in the lead storage S, when writing is performed with the front of the mechanical pencil 10 being located vertically downward, the indication body 70 moves forward by its own weight so as to be located at the frontmost position shown by the solid lines in FIG. 7. At this time, as shown in FIGS. 6 and 7, the rear indication body 70B of the indication body 70 faces the window part 22 of the shaft tube 20 in a direction perpendicular to the axial direction AD. Namely, as shown in FIG. 6, the outer surface of the rear indication body 70B can be seen through the window part 22. Then, as shown in FIG. 5, different indications are provided on the outer circumferential surfaces of the front indication body 70A and the rear indication body 70B. Typically, the outer circumferential surfaces of the front indication body 70A and the rear indication body 70B have different colors. For example, the front indication body 70A and the rear indication body 70B are molded of resin materials having different colors. Thus, whether there is spare lead SLE can be determined based on the indication seen through the window part 22, i.e., the color seen through the window part 22 in the illustrated example.

As described above, the indication body 70 has a columnar shape. Note that, as shown in FIG. 5, the indication body 70 has a substantially columnar indication body part 71, and a flange part 72 protruding from the indication body part 71. The flange part 72 protrudes from the indication body part 71 in a direction non-parallel to the axial direction AD. In the illustrated example, the flange part 72 protrudes from the indication body part 71 in a direction perpendicular to the axial direction AD.

The lead LE and the spare lead SLE are located in the lead storage space S. Since the lead LE and the spare lead SLE rub with each other and/or the lead LE or the spare lead SLE rubs the wall and so on defining the lead storage space S, lead powder may be generated in the lead storage space S. There is a possibility that lead powder enters between the indication body 70 and the tubular portion TP accommodating the indication body 70. In this case, lead powder puts on the inner surface of the tubular portion TP to contaminate the tubular portion TP. As a result, visibility of the indication body 70 through the window part 22 is impaired. In addition, lead powder may go outside the shaft tube 20. In order to prevent these troubles and to prevent lead powder in the lead storage space S from entering the indication body 70 and the tubular portion TP (the front tubular part 62 of the knock member 61 in the illustrated example), the flange part 72 is provided.

Thus, as shown in FIGS. 4 and 5, the flange part 72 is provided on a front end of the indication body 70. This can effectively prevent lead powder from entering between the indication body 70 and the tubular portion TP. In order to avoid impairment of visibility of the indication body 70 through the window part 22, the flange part 72 extends in the circumferential direction at least over the range where the window part 22 is provided. Particularly in the illustrated example, the flange part 72 extends annularly around the indication body part 71.

When spare lead SLE is stored in the lead storage space S, the indication body 70 is located at substantially the constant position in the axial direction AD, in the writing state where the front of the mechanical pencil 10 is directed vertically downward. On the other hand, since the flange part 72 wipes or gathers lead powder on the tubular portion TP accommodating the indication body 70 during the movement of the indication body 70, lead powder is likely to put on the flange part 72. As a result, lead powder is likely to locally put on a part of the tubular portion TP accommodating the indication body 70, which part tends to face the flange part 72. In consideration of this point, in the illustrated example, as shown in FIGS. 1 and 4, when the mechanical pencil 10 is used, the flange part 72 of the indication body 70, which is supported by the spare lead SLE stored in the lead storage space S from forward in the axial direction AD, is located forward the window part 22 in the axial direction AD. By adjusting the position of the flange part 72 with respect to the window part 22 in the axial direction AD in this manner, the flange part 72 onto which lead powder is likely to put can be maintained invisible through the window part 22. In addition, lead powder can be effectively prevented from locally putting on the window part 22.

A length of the flange part 72 along the axial direction AD is preferably equal to or less than 1.5 mm. By reducing the length of the flange part 72 along the axial direction AD, an area where the tubular portion TP accommodating the indication body 70 and the flange part 72 rub with each other can be made small. Thus, friction during the movement of the indication 70 in the axial direction AD can be reduced to make smooth the movement of the indication body 70. In addition, since the flange part 72 onto which lead powder is likely to put has a small size, contamination can be made inconspicuous. Further, a region of the inner surface of the tubular portion TP, with which lead powder may be caused to rub by the flange part 72, can be effectively made small.

Further, as shown in FIGS. 4 and 5, the indication body 70 has a rear flange part 73 in addition to the flange part 72. The rear flange part 73 protrudes from the indication body part 71 in a direction non-parallel to the axial direction AD. In the illustrated example, the rear flange part 73 protrudes from the indication body part 71 in a direction perpendicular to the axial direction. The provision of the rear flange part 73 can more effectively prevent lead powder in the lead storage space S to go outside the shaft tube 20.

In the illustrated example, the rear flange part 73 is provided on a rear end of the indication body part 71. The provision of the rear flange part 73 on the rear end of the indication body part 71 can more effectively prevent lead powder from going out from the tubular portion TP accommodating the indication body 70. In addition, the rear flange part 73 onto which lead powder is likely to put can be effectively suppressed from being seen through the window part 22, so that contamination can be made inconspicuous.

The rear flange part 73 extends annularly around the indication body part 71. The rear flange part extending annularly around the indication body part 71 can more effectively prevent lead powder from going out from the tubular portion TP accommodating the indication body 70.

Further, when no spare lead SLE is stored in the lead storage space S, the indication body 70 is located at the frontmost position (position shown by solid lines in FIG. 7) which is most forward in the axial direction AD, in the writing state where the front of the mechanical pencil 10 is directed vertically downward. On the other hand, since the rear flange part 73 wipes lead powder on the tubular portion TP accommodating the rear flange part 73, lead powder is likely to put on the rear flange part 73. As a result, lead powder is likely to locally put on a part of the tubular portion TP accommodating the indication body 70, which part tends to face the rear flange part 73. In consideration of this point, the rear flange part 73 of the indication body 70, which has moved to the frontmost position that is most forward in the axial direction AD, is preferably located rearward the window part 22 in the axial direction AD. By adjusting the position of the rear flange part 73 with respect to the window part 22 in the axial direction AD in this manner, the rear flange part 73 onto which lead powder is likely to put can be maintained invisible through the window part 22. In addition, lead powder can be effectively prevented from locally putting on the window part 22.

A length of the rear flange part 73 along the axial direction AD is preferably equal to or less than 1.5 mm. By reducing the length of the rear flange part 73 along the axial direction AD, an area where the tubular portion TP accommodating the indication body 70 and the rear flange part 73 rub with each other can be made small. Thus, friction during the movement of the indication 70 in the axial direction AD can be reduced to make smooth the movement of the indication body 70. In addition, since the rear flange part 73 onto which lead powder is likely to put has a small size, contamination can be made inconspicuous. Further, a region of the inner surface of the tubular portion TP, with which lead powder may be caused to rub by the rear flange part 73, can be effectively made small.

As described above, the knock member 61 of the knock unit 60 has the tubular portion TP accommodating the indication body 70 movably in the axial direction AD. As well shown in FIGS. 4 and 5, in order make smooth the movement of the indication body 70 in the tubular portion TP in the axial direction AD, a hole H for ventilation is formed in the tubular portion TP. Particularly in the illustrated example, a pair of holes H are located at symmetrical positions, in other others, their phases are shifted at 180°.

The hole H is preferably located rearward in the axial direction AD the indication body 70 located at the rearmost position which is most rearward in the axial direction AD. According to this example, air can smoothly flow into the tubular portion TP behind the indication body 70, and can stably flow out from the tubular portion TP. This can make smooth the movement of the indication body 70 in the tubular portion TP in the axial direction AD.

As another example, when the hole H is positioned within the range where the indication body 70 is movable in the axial direction AD, as in the example shown in FIG. 4, a length of the hole H along the axial direction AD (e.g., diameter) is preferably longer than a length of the rear flange part 73 along the axial direction AD. According to this example, regardless of the position of the indication body 70 in the axial direction AD, for example, even when the rear flange part 73 of the indication body 70 is located in the same region as the hole H in the axial direction AD, air can stably flow into the tubular portion TP and flow out from the tubular portion TP. This can make stable and smooth the movement of the indication body 70 in the tubular portion TP along the axial direction AD. When the flange part 72 may be located in the same region as the hole H in the axial direction AD, a length of the hole H along the axial direction (e.g., diameter) is preferably longer than a length of the flange part 72 along the axial direction AD for the same reason.

In addition, an area of the hole H in plane view is preferably lager than an area of a gap between the tubular portion TP and a part of the indication body 70, which has the largest area, in a section perpendicular to the axial direction AD. In the illustrated example, an area of the hole H is preferably larger than an area of a gap between the tubular portion TP (front tubular part 62) and the flange part 72 of the indication body 70 in a section perpendicular to the axial direction AD, and is preferably larger than an area of a gap between the tubular portion TP and the rear flange part 73 of the indication body 70 in a section perpendicular to the axial direction AD. Further, in the illustrated example, an area of the hole is preferably larger than an area of a gap between the tubular portion TP (front tubular part 62) and the indication body part 71 of the indication body 70 in a section perpendicular to the axial direction AD According to this embodiment, air can effectively stably flow into the tubular portion TP and flow out from the tubular portion TP.

In the above, the structure of the mechanical pencil 10, the operation of the indication body 70, specifically, the fact that the indication body 70 can indicate whether there is spare lead SLE, and can smoothly move in the tubular portion TP are described. Next, an operation of the mechanical pencil 10 when writing is described.

In the illustrated mechanical pencil 10, the knock unit 60 is pushed forward along the axial direction AD as the knock operation. The knock unit 60 moves forward, together with the intermediate tube member 50, against a spring force of the intermediate pressing member 28. When the knock unit 60 and the intermediate tube member 50 move forward by a length G between the inner rib 52 of the intermediate tube member 50 and the rear end surface 44*a* of the lead storage tube 44 shown in FIG. 4, the inner rib 52 and the rear end surface 44*a* come into contact with each other so that the intermediate tube member 50 pushes the lead holding unit 40 forward. Further, the knock operation continues so that the lead holding unit 40 moves forward. Since the lead holding unit 40 relatively moves forward with respect to the ferrule unit 30, the lead holding unit 40 ejects the lead LE.

Figure 8:
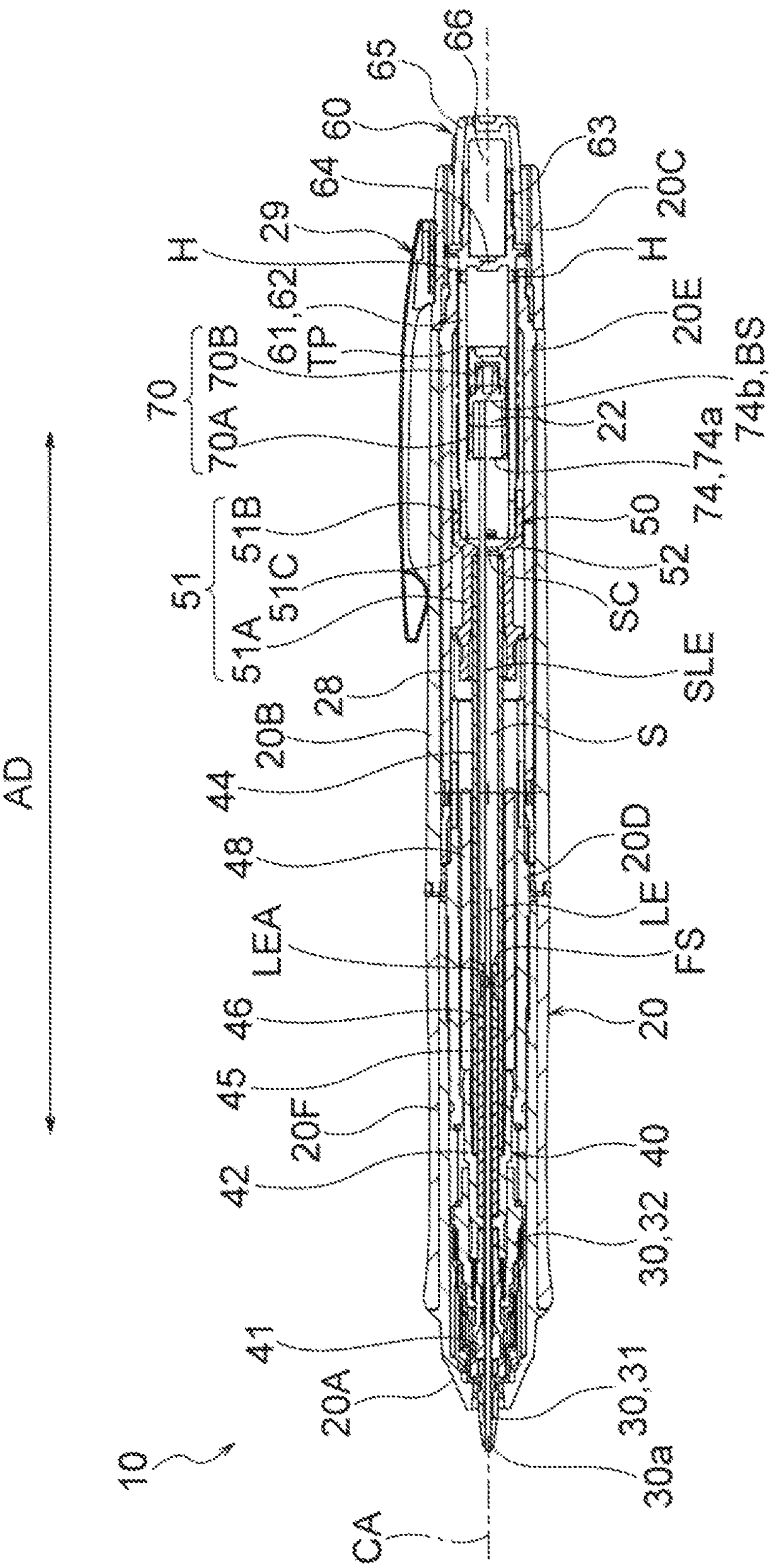
FIG. 8 is a view corresponding to FIG. 2, which is a longitudinal sectional view of FIG. 1 storing spare lead, in a state where a knock operation is performed.
Figure 9:
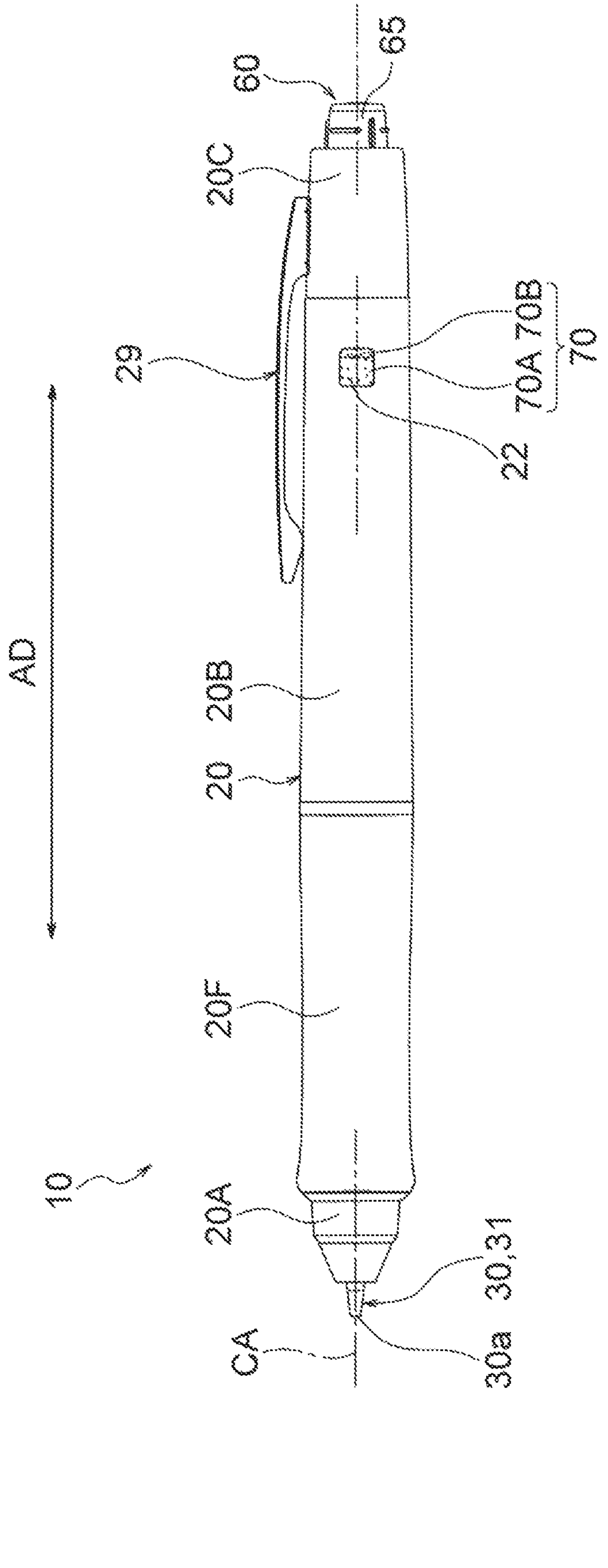
FIG. 9 is a view corresponding to FIG. 1, which is a plan view showing the mechanical pencil of FIG. 8 storing spare lead, in a state where the knock operation is performed.
Figure 10:
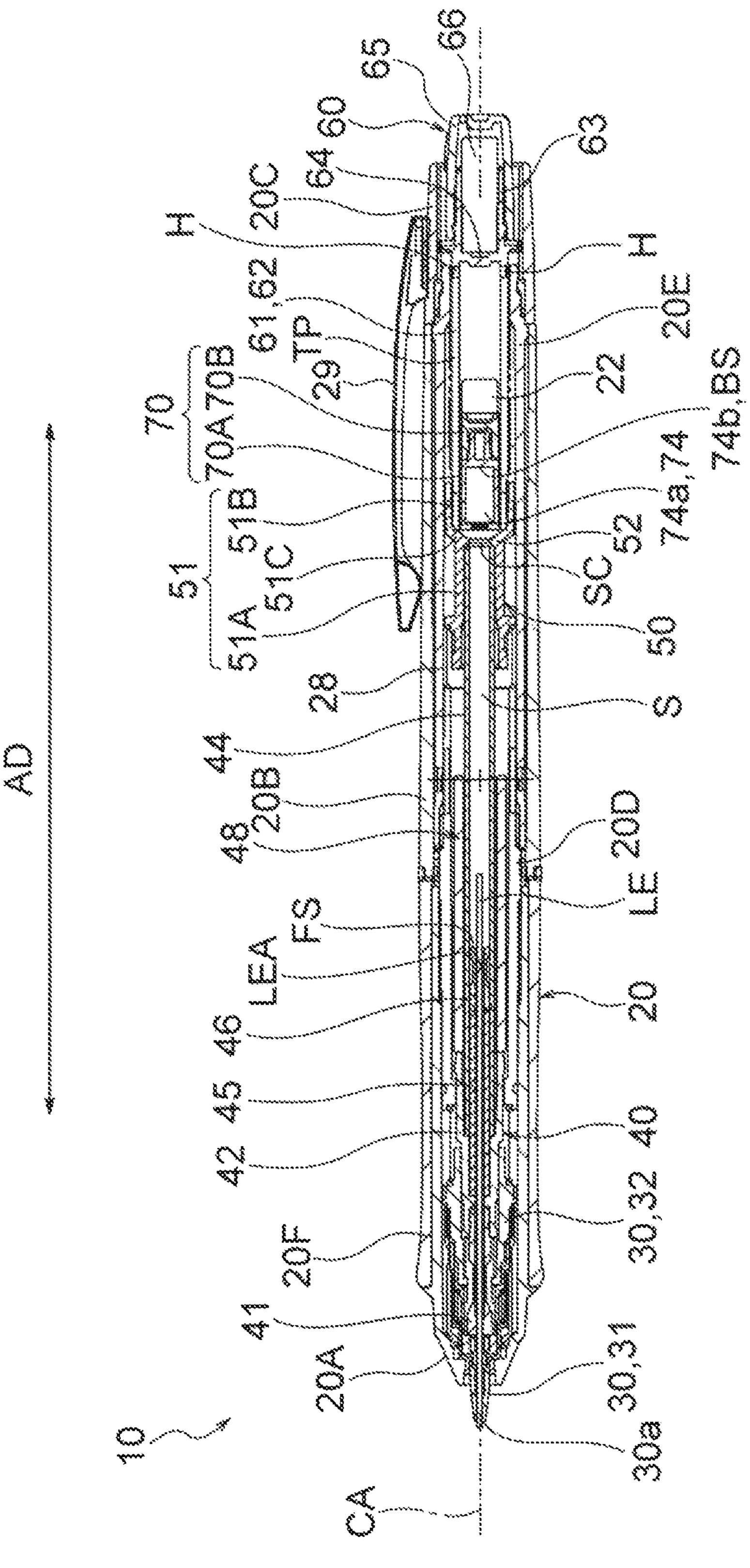
FIG. 10 is a view corresponding to FIG. 2, which is a longitudinal sectional view of FIG. 1 storing no spare lead, in a state where the knock operation is performed.

FIGS. 8 to 10 show the mechanical pencil 10 during the knock operation. In these drawings, it is assumed that the knock operation is performed in a state where the front of the mechanical pencil 10 is located vertically downward.

FIGS. 8 and 9 show the mechanical pencil 10 including spare lead SLE in the lead storage space S. In the illustrate example, in a state where the knock unit 60 has been moved most forward by the knock operation, the front indication body 70A of the indication body 70 occupies most part of the area facing the window part 22, but the rear indication body 70B is slightly visible. Namely, with the spare lead SLE being stored in the lead storage space S, the indication of the indication body 70 Such a change in indication in accordance with the knock operation draws the user's attention and makes the user recognize the indication function again, which can make more attractive the mechanical pencil 10.

Figure 11:
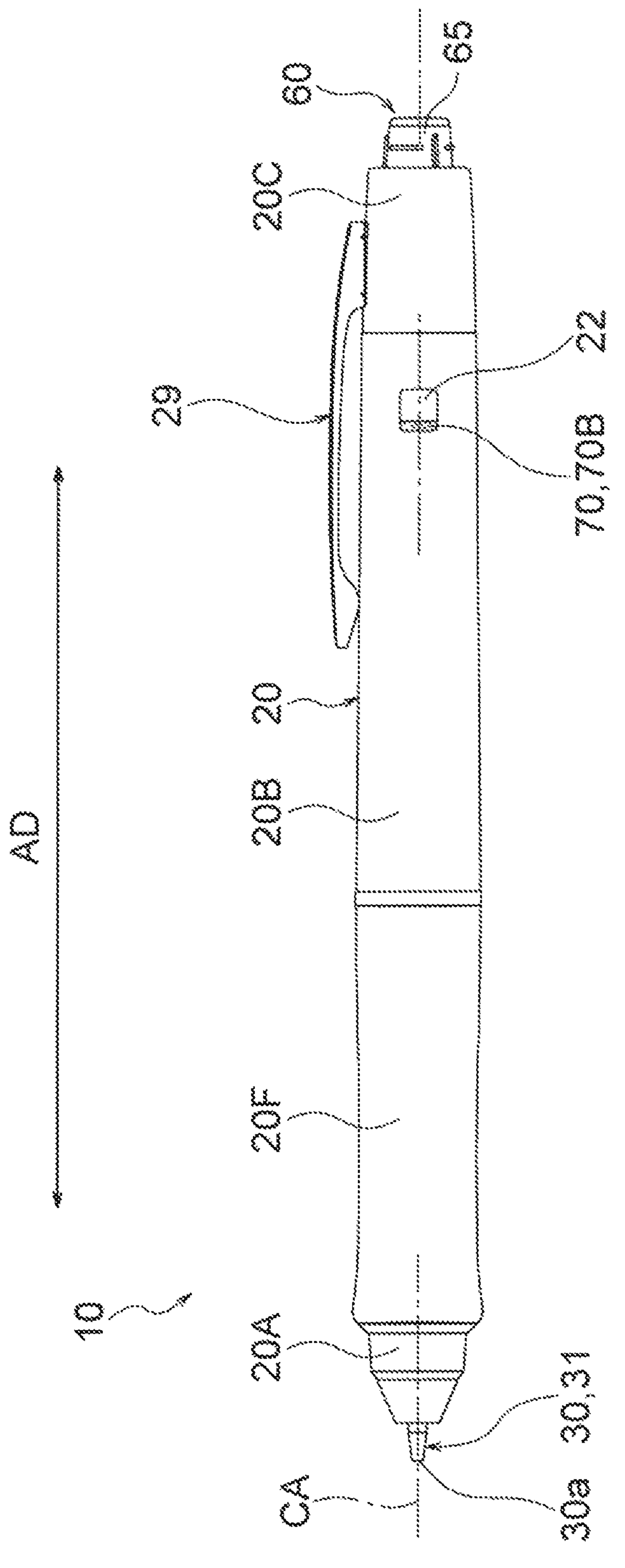
FIG. 11 is a view corresponding to FIG. 1, which is a plan view showing the mechanical pencil of FIG. 10 storing no spare lead, in a state where the knock operation is performed.

Similarly, FIGS. 10 and 11 show the mechanical pencil 10 including no spare lead SLE in the lead storage space S, which is subjected to the knock operation. In the illustrated example, in a state where the knock unit 60 has been moved most forward by the knock operation, the rear indication body 70B of the indication body 70 slightly remains in the area facing the window part 22. At this time, the indication body 70 does not face the majority of this area, i.e., a part exceeding 50% of this area. Thus, the opposite side of the mechanical pencil 10 can be seen through the pair of window parts 22. Thus, also when there is no spare lead SLE in the lead storage space S, the indication, which can be seen through the window part 22, changes, when the knock unit 60 has been completely pushed by the knock operation. In particular, the unexpectedness that the opposite side of the mechanical pencil 10 can be seen through the window parts 22 can greatly draw the user's attention. This makes the user recognize the indication function again, which can make more attractive the mechanical pencil 10.

In the illustrated mechanical pencil 10, the indication body 70 is not pressed by a compression spring or the like. Thus, during the use of the mechanical pencil 10, by changing a posture (inclination) of the mechanical pencil 10 between a state where the front of the mechanical pencil 10 is located vertically downward and a state where the front of the mechanical pencil 10 is located vertically upward, the indication body 70 moves in the tubular portion TP of the knock unit 60 in the axial direction AD. Namely, by changing the inclination of the mechanical pencil 10, the indication seen through the window part 22 can be changed. This also makes the user recognize the indication function again, which can make more attractive the mechanical pencil 10.

As shown in FIGS. 2 and 3, the mechanical pencil 10 further has a weight body 48. The lead storage tube 44 passes through the weight body 48. The weight body 48 is a tubular member (cylindrical member) made of metal. The weight body 48 is movable in the axial direction AD with respect to the lead holding unit 40. The weight body 48 can move rearward until it comes into contact with the intermediate tube member 50. In addition, the weight body 48 can move forward until it comes into contact with the rear end surface of the chuck holding member 42 of the lead holding unit 40. When the mechanical pencil 10 is shaken forward, the weight body 48 causes, by its inertia, the lead holding unit 40 including the chuck holding member 42 to relatively move forward with respect to the ferrule unit 30. Namely, the user of the mechanical pencil 10 can eject the lead LE by shaking the mechanical pencil 10 forward, in place of pushing the knock unit 60.

In the illustrated example, the intermediate tube member 50 is provided rearward the lead holding unit 40 and is movable in the shaft tube 20 in the axial direction AD. The intermediate tube member 50 has the tubular body part 51, and the inner rib 52 protruding from the inner surface of the tubular body part 51. During forward movement along the axial direction AD, the inner rib 52 comes into contact with the rear end surface 44*a* of the lead storage tube 44 to push the lead holding unit 40 forward. Due to the provision of such an intermediate tube member 50, the lead holding unit 40 is relatively movable with respect to the intermediate tube member 50 in the axial direction AD. According to such a structure, in a state where the intermediate tube member 50 and the knock unit 60 which can be mounted on the intermediate tube member 50 are stopped in the axial direction AD, the lead holding unit 40 is movable in the axial direction AD. This structure is advantageous in that no impact is made on the knock unit 60, in a structure where the lead LE is ejected using the weight body by shaking the mechanical pencil 10 in the axial direction AD, and a structure where the lead holding unit 40 is retracted to protect the lead LE when a force is applied to the lead LE.

In particular, when the mechanical pencil 10 is shaken back and forth, the weight body 48 is also moved rearward. The weight body 48 having moved rearward collides, not with the knock unit 60, but with the intermediate tube member 50. The rearward movement of the intermediate tube member 50 is restricted by the projection 20Ea (see FIG. 4) provided on the rear inside shaft tube 20E of the shaft tube 20. Thus, when the mechanical pencil 10 is shaken back and forth, the knock unit 60 can be effectively avoided from escaping from the shaft tube 20.

Further, when there is spare lead SLE in the lead storage space S, while the knock unit 60 is moving forward by the gap G between the inner rib 52 and the rear end surface 44*a* of the lead storage tube 44, the indication body 70 is supported by the spare lead SLE from below. For this while, since the position of the lead holding unit 40 including the lead storage tube 44 in the axial direction AD is maintained, the position of the indication body 70 in the axial direction AD is also unchanged. Thereafter, when the knock unit 60 moves forward together with the lead holding unit 40, the indication body 70 also moves forward to change its position in the axial direction AD. Namely, behind the operation of the knock unit 60 by the user, the movement of the indication body 70 starts so that the indication of the indication body 70 seen through the window part 22 changes. The unexpectedness of such a change in the indication can also greatly draw the user's attention. This makes the user recognize the indication function again, which can make more attractive the mechanical pencil 10.

When there is no spare lead SLE in the lead storage space S, the indication body 70 is supported by the restriction convex portion 62*c* (see FIG. 5) of the knock unit 60 from below. Thus, the indication body 70 moves forward in synch with the forward movement of the knock unit 60, while the lead holding unit 40 stops. Namely, depending on whether there is spare lead SLE in the lead storage space S, the switching timing of the indication of the indication body 70 seen through the window part 22 changes. This also draws the user's attention, which can make more attractive the mechanical pencil 10.

In the illustrated example, the lead ejection aperture LEA connecting the lead storage space S and the chuck 41 of the lead holding unit 40 is relatively long. As a specific structure, auxiliary tube members (inside auxiliary tube 45 and inside guide member 46) are disposed in the chuck holding member 42 holding the chuck 41 and the lead storage tube 44 held by the chuck holding member 42 to ensure the long lead ejection aperture LEA. As shown in FIG. 7, a length LB along the axial direction AD between the front end of the lead storage space S and the front end of the ferrule unit 30 is longer than half of the length of the spare lead SLE. Particularly in the illustrated example, the length LB is longer than ⅔ of the length LX of the spare lead SLE, and even longer than ¾ of the length LX of the spare lead SLE. According to such a mechanical pencil 10, the lead held by the chuck 41 can be effectively prevented from being largely inclined with respect to the axial direction AD. This can make smooth ejection of the lead LE from the lead holding unit 40.

In this mechanical pencil 10, the indication body 70 is placed on the spare lead SLE during normal writing and knock operation where the front of the mechanical pencil 10 is located vertically downward. As shown in FIG. 3, the front wall surface FS is inclined rearward in the axial direction AD as it separates away from the lead ejection aperture LEA along a direction perpendicular to the axial direction AD. Thus, the spare lead SLE in the lead storage space S is pushed by the weight of the indication body 70 so as to be guided to the lead ejection aperture LEA opened to the front wall surface FS of the lead storage space S. Namely, the spare lead SLE in the lead storage space S can be smoothly supplied to the lead ejection aperture LEA by using the weight of the indication body 70.

On the other hand, as shown in FIG. 7, the length LB along the axial direction AD between the front end of the lead storage space S and the front end of the ferrule unit 30 is shorter than the length of the spare lead SLE. Namely, when consumption of the lead LE grasped by the chuck 41 is small, as shown in FIG. 2, the lead LE protrudes from the front surface FS into the lead storage space S. Thus, there is a possibility that the spare lead SLE enters like a wedge between the lead LE held by the chuck 41 with the rear end thereof protruding into the lead storage space S and the front wall surface FS, which may make difficult the smooth ejection of the lead LE.

In order to deal with such a trouble, the inclination angle θx of the front wall surface FS with respect to the axial direction AD should not be excessively small, unlike that of a conventional mechanical pencil. From the viewpoint of making smooth the ejection of the lead LE, the inclination angle θx is preferably more than 45° and less than 85, more preferably more than 60° and less than 85, yet preferably more than 70° and less than 85°, and most preferably more than 75° and less than 85°. Due to the thus selected inclination angle θx, the distal end of the spare lead SLE pushed by the weight of the indication body 70 can be effectively avoided from fitting between the lead LE held by the chuck 41 with the rear end thereof protruding into the lead storage space S and the front wall surface FS. This can effectively suppress that the ejection of the lead LE inserted into the lead ejection aperture LEA is blocked by the spare lead SLE. On the other hand, when the lead LE does not extend rearward from the lead ejection aperture LEA in the axial direction, the spare lead SLE can be stably guided into the lead ejection aperture LEA.

In the illustrated example, the front wall surface FS is rotationally symmetrical. In particular, the front wall surface FS has a shape of a side surface of a cone. Such a front wall surface FS allows many spare lead SLE to be stored in the lead storage space S in a dispersed manner. In addition, when the lead LE does not extend rearward from the lead ejection aperture LEA in the axial direction, the spare lead SLE can be stably guided into the lead ejection aperture LEA.

Further, such a trouble becomes serious when the inclination angle of the spare lead SLE in the lead storage space S with respect to the axial direction AD is large. In this embodiment, the lead storage space S has the reduced width part SC having a narrow inside dimension (inner width, internal diameter) at the intermediate part in the axial direction AD, in order for reducing the inclination angle of the spare lead SLE in the lead storage space S. Particularly in the illustrated example, the reduced width part SC is formed by the inner rib 52 of the intermediate tube member 50. The inner width (internal diameter) of the intermediate tube member 50 at the position where the inner rib 52 is provided is smaller than the inner width (internal diameter) of the lead storage tube 44. Due to the provision of such a reduced width part SC formed by the inner rib 52, the spare lead SLE stored in the lead storage space S can be effectively prevented from being largely inclined with respect to the axial direction AD. Thus, it can be effectively avoided that the distal end of the spare lead SLE pushed by the weight of the indication body 70 fits like a wedge between the lead LE held by the chuck 41 to extend to the lead storage space S and the front fall surface FS delimiting the lead storage space S from forward. As a result, the ejection of the lead LE upon the knock operation can be made stable and smooth. In addition, the spare lead SLE stored in the lead storage space S can be effectively prevented from spreading toward rear ends. Thus, attachment of the knock unit 60 to the intermediate tube member 50 can be performed easily and stably.

Particularly in the illustrated example, the length LC (see FIG. 2) along the axial direction AD from the front end of the lead storage space S up to the reduced width part SC is longer than half of the length of the spare lead SLE. By adjusting the axial position of the reduced width part SC in this manner, the spare lead SLE stored in the lead storage space S can be effectively prevented from being largely inclined in the axial direction. In addition, rear ends of the spare lead SLE stored in the lead storage space S can be effectively prevented from spreading the toward rear ends.

Note that, as described above, different from the illustrated example, the inner width of the intermediate tube member 50 at the position where the inner rib 52 is provided may be larger than the inner width of the lead storage tube 44. Such an intermediate tube member 50 can effectively prevent the lead LE from being jammed in the lead storage space S at the position where the inner rib 52 is provided. In addition, when new spare lead SLE is is inserted from the ferrule unit 30 into the mechanical pencil 10 to replenish the lead storage space S with lead LE, the lead LE can be effectively prevented from being caught by the inner rib 52.

Further, different from the illustrated example, the inner width of the intermediate tube member 50 at the position where the inner rib 52 is provided may be equal to the inner width of the lead storage tube 44. Such an intermediate tube member 50 can effectively prevent the lead LE from being jammed in the lead storage space S at the position where the inner rib 52 is provided. In addition, when new spare lead SLE is inserted from the ferrule unit 30 into the mechanical pencil 10 to replenish the lead storage space S with lead LE, and when the lead storage tube 44 is replenished with lead LE through the intermediate tube member 50, the lead LE can be effectively prevented from being caught by the inner rib 52. Moreover, the lead holding unit 40 can be stably moved axially forward through the intermediate tube member 50.

Next, replenishment of spare lead SLE is described. When the lead storage space S is replenished with spare lead SLE, the knock unit 60 is pulled out rearward from the mechanical pencil 10. By pulling out the knock unit 60, as can be understood from FIG. 4, the intermediate tube member 50 is exposed rearward in the shaft tube 20. The intermediate tube member 50 has the rear tube part 51B having a larger width (larger diameter) on the rearmost side. By inserting the spare lead SLE into the rear tube part 51B, the spare lead SLE is guided to the front tube part 51A and the lead storage tube 44 through the intermediate tapering part 51C tapering forward. After the insertion of the spare lead SLE, the knock unit 60 is inserted into the rear of the shaft tube 20. As described above, the inner rib 52 of the intermediate tube member 50 prevents the spare lead SLE stored in the lead storage space S from spreading toward the rear ends. Thus, the knock unit 60 can be guided by the window part 22 and the intermediate tube member 50 so as to be easily attached to the mechanical pencil 10

Figure 12:
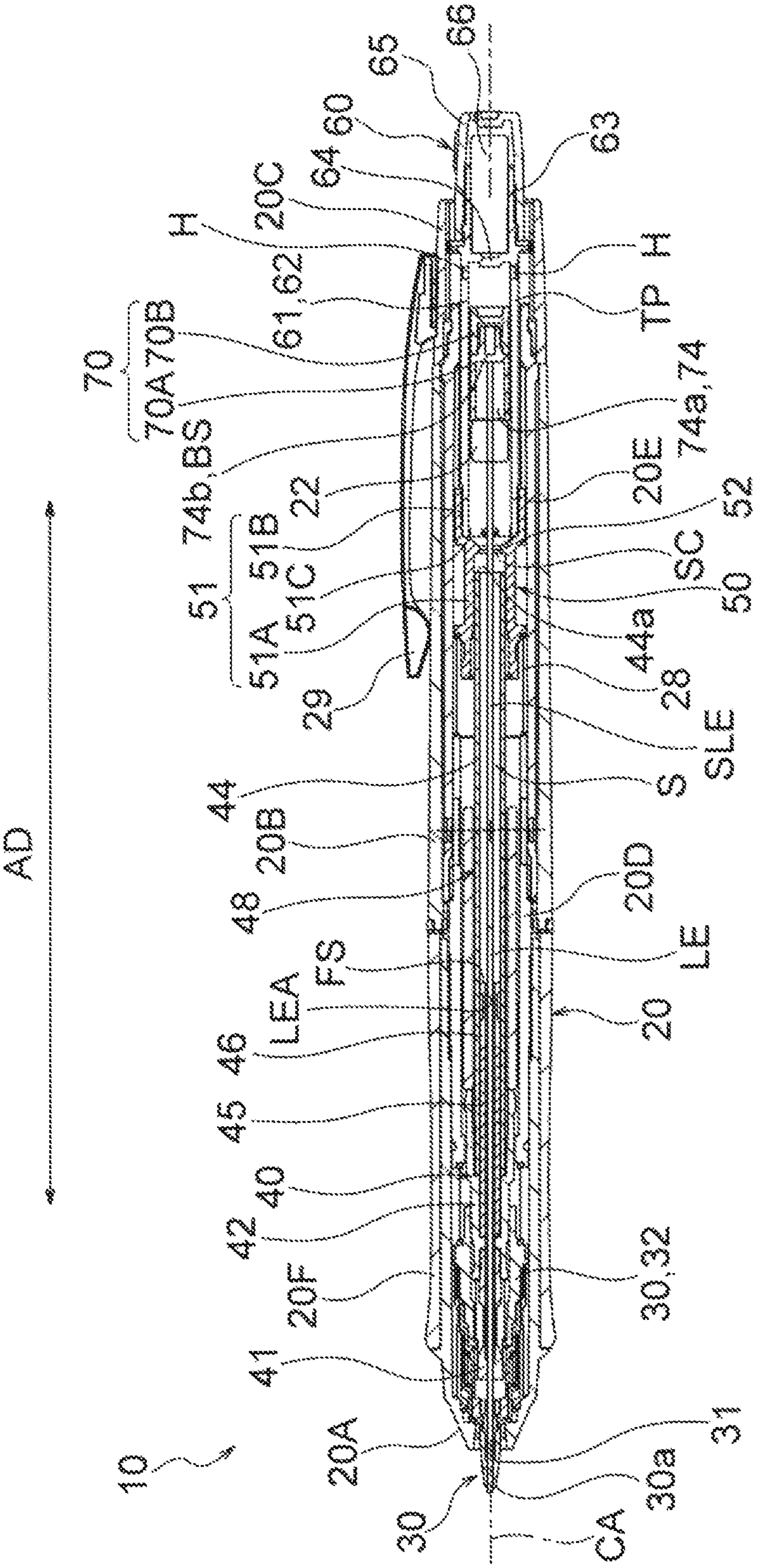
FIG. 12 is a view corresponding to FIG. 2, which is a longitudinal sectional view of the mechanical pencil of FIG. 1 wherein lead held by a lead holing unit and spare lead in a lead storage space are aligned.

It is also conceivable that the spare lead SLE is inserted from the front end opening 30*a* of the mechanical pencil 10. At this time, as shown in FIG. 12, the distal end of the spare lead SLE already stored in the lead storage space S may overlap the rear end of the spare lead SLE newly inserted from the front end opening 30*a*. Namely, the former spare lead SLE and the latter spare lead SLE may be aligned in series in the axial direction AD in the mechanical pencil 10. The spare lead SLE located rearward is pushed rearward from the front wall surface FS of the lead storage space S by the spare lead SLE located forward. When the axial length of the lead storage space S is insufficient, the spare lead SLE located rearward is sandwiched between the rear end surface of the spare lead SLE located forward and the rear wall surface BS delimiting the lead storage space S from rearward. As a result, either of the spare lead SLE located rearward or the spare lead SLE located forward may be broken. Such a trouble may occur, not only when the spare lead SLE is inserted from the front end opening 30*a* of the mechanical pencil 10, but also when the lead LE largely ejected is again returned into the mechanical pencil 10.

Thus, in this embodiment, the length LA (see FIG. 7) along the axial direction AD between the rear end of the lead storage space S and the front end of the ferrule unit 30 in a state where the indication body 70 has moved most rearward along the axial direction AD (rearmost position shown by two-dot chain lines in FIG. 7) is equal to or more than twice the length LX (see FIG. 2) of the spare lead SLE to be stored in the lead storage space S. Thus, even when the spare lead SLE overlaps the rear end of the lead LE held by the chuck 41, the spare lead SLE can be stored in the lead storage space S because the indication body 70 moves rearward. For example, when new spare lead SLE is inserted from the ferrule unit 30 into the mechanical pencil 10, and when the lead LE ejected largely from the ferrule unit 30 is returned into the mechanical pencil 10, it can be effectively avoided that the lead LE cannot be completely pushed into the mechanical pencil 10 and that the lead is broken in the lead storage space.

In the illustrated example, the knock unit 60, together with the intermediate tube member 50, can relatively move forward toward the lead holding unit 40. At this time, a relative movement amount is a length of the gap G along the axial direction AD between the rear end surface 44*a* of the lead storage tube 44 and the inner rib 52 of the intermediate tube member 50 during non-knock (in a state where the knock unit 60 is not pushed). Thus, in the illustrated example, in order to avoid troubles in that the lead cannot be completely pushed rearward and that the lead is broken in the lead storage space, the length LA (see FIG. 7) along the axial direction AD between the rear end of the lead storage space S and the front end of the ferrule unit 30 in a state where the indication body 70 has moved most rearward along the axial direction AD is more preferably equal to or more than a sum of a length which is twice the length LX (see FIG. 2) of the spare lead SLE to be stored in the lead storage space S and the length of the gap G during the non-knock. However, when the knock operation is performed, the spare lead SLE located rearward is generally guided to be shifted from the rear end of the front lead LE inserted in the lead ejection aperture LEA in a direction non-parallel to the axial direction AD. Thus, the condition in which the length LA (see FIG. 7) is equal to or more than a sum of the length which is twice the length LX of the spare lead SLE and the length of the gap G during non-knock is not an indispensable condition. The length LA (see FIG. 7) equal to or more than a length which is twice the length LX of the spare lead SLE can effectively deal with the trouble. The length of the gap G in the axial direction AD may also be referred to as a length in the axial direction AD along which the front wall surface FS delimiting the lead storage space S from forward and the tubular portion TP accommodating the indication body 70 delimiting the lead storage space S from rearward movably in the axial direction AD can be relatively moved.

In addition, during the general knock operation, the fastener 43 of the lead holding unit 40 comes into contact with the restriction step 32*a* of the ferrule unit 30, the head part 41*a* of the chuck 41 releases the lead LE. The lead LE released from the chuck 41 is held stationarily by the lead holding member 37. Namely, a length of the lead ejected by a single knock operation is shorter than a length along which the lead holding unit 40 moves forward upon a single knock operation. When the spare lead SLE is aligned in series behind the lead LE, there is a possibility that the indication body 70 which moves forward together with the knock unit 60 pushes the lead LE forward through the spare lead SLE. Namely, a trouble may occur in that the spare lead SLE overlapping from rearward the lead LE held by the chuck 41 is pushed by the knock unit 60 and the indication body 70 upon the knock operation, so that the lead LE is ejected longer than an intended length to be ejected by a single knock operation. In order to avoid such a trouble and to make uniform the length of the lead ejected by a single knock operation, the length LA (see FIG. 7) along the axial direction AD between the rear end of the lead storage space S and the front end of the ferrule unit 30 in a state where the indication body 70 has moved most rearward along the axial direction AD is more preferably equal to or more than a sum of a length which is twice the length LX (see FIG. 2) of the spare lead SLE to be stored in the lead storage space S and a difference between the length along which the lead holding unit 40 moves forward upon a single knock operation and an intended length of the lead to be ejected by a single knock operation.

In particular, the gap G is set in the aforementioned mechanical pencil 10. Thus, in order to make uniform the length of the lead ejected by a single knock operation, the length LA (see FIG. 7) is furthermore preferably equal to or more than a sum of a length which is twice the length LX (see FIG. 2) of the spare lead SLE stored in the lead storage space S, a difference between the length along which the lead holding unit 40 moves forward upon a single knock operation and an intended length of the lead to be ejected by a single knock operation, and a length of the gap G.

For further safety, the length LA (see FIG. 7) is yet furthermore preferably equal to or more than a sum of a length which is twice the length LX (see FIG. 2) of the spare lead SLE stored in the lead storage space S, and a length along which the knock unit 60 moves forward upon a single knock operation. In other words, the length along the axial direction AD between the rear end of the lead storage space S and the front end of the ferrule unit 30 in a state where the indication body 70 has moved most rearward along the axial direction AD is further preferably equal to or more than a length which is twice the length LX (see FIG. 2) of the spare lead SLE to be stored in the lead storage space S. This structure can more stably prevent that the spare lead SLE is broken and that the lead LE is ejected larger than an intended length to be ejected by a single knock operation, even when the spare lead SLE is aligned with the rear end of the lead LE held by the lead holding unit 40 in the axial direction AD.

Note that, as described above, when the knock operation is performed, the spare lead SLE is generally guided to be shifted from the rear end of the front lead LE inserted in the lead ejection aperture LEA in a direction non-parallel to the axial direction AD. Thus, the condition in which the length LA (see FIG. 7) is equal to or more than a length which is twice the length LX of the spare lead SLE is not an indispensable condition but a preferred condition. The fact that the length LA (see FIG. 7) is equal to or more than a length which is twice the length LX of the spare lead SLE can produce an efficient effect of preventing breakage of the spare lead SLE.

As described above, in the illustrated mechanical pencil 10, the length LA along the axial length AD between the rear end of the lead storage space S and the front end of the ferrule unit 30 in a state where the indication body 70 has moved most rearward (rearmost position) along the axial direction AD is sufficiently long. However, the indication body 70 is provided with the recess 74 opened forward in the axial direction AD. According to this specific example, the recess 74 of the indication body 70 function as a part of the lead storage space S. Thus, the length of the lead storage space S along the axial direction AD can be made sufficiently long, while avoiding enlargement of length of the mechanical pencil 10 along the axial direction AD. At the same time, an indication space spreading widely in the axial direction can be ensured on the outer peripheral surface of the indication body 70.

Particularly in the illustrated example, a depth LD of the recess 74 along the axial direction AD is larger than half of a length LL of the indication body 70 along the axial direction AD. This condition is advantageous in that the indication space of the indication body 70 is enlarged and that the length of the lead storage space S is elongated, while enlargement of the length of the mechanical pencil 10 along the axial direction AD is avoided. Thus, the use of such an indication body 70 makes it possible that the indication space of the indication body 70 is effectively enlarged, and that the length of the lead storage space S can be effectively elongated, while enlargement of the length of the mechanical pencil 10 along the axial direction AD is avoided.

In the illustrated example, the indication body 70 has the inside wall surface 74*a* and the bottom wall surface 74*b* delimiting the recess 74. The bottom wall surface 74*b* forming the rear wall surface BS of the lead storage space S is a plane which is not parallel to the axial direction AD. Particularly in the illustrated example, the bottom wall surface 74*b* is a plane perpendicular to the axial direction AD. Thus, the lead storage space S somewhat widens in a direction orthogonal to the axial direction AD, and the spare lead SLE stored in the lead storage space S is guided by the rear wall surface BS to move in a direction perpendicular to the axial direction AD. This makes it easy to eliminate a state where the spare lead SLE comes from rearward into contact with the lead LE held by the chuck 41 to be in alignment therewith in the axial direction AD.

Not limited to the illustrated example, the bottom wall surface 74*b* may be a plane inclined with respect to the axial direction AD. The bottom wall surface 74*b* may be a plane inclined rearward to radially outward, or may be a plane inclined forward to radially outward. When the bottom wall surface 74*b* is a plane inclined rearward to radially outward, the spare lead SLE stored in the lead storage space S can be dispersed radially outward from the center axis line CA. When the bottom wall surface 74*b* is a plane inclined forward to radially outward, the spare lead SLE stored in the lead storage space S can be gathered radially at the center axis line CA so that guidance of the spare lead SLE to the lead ejection aperture LEA can be made further smooth.

Figure 13:
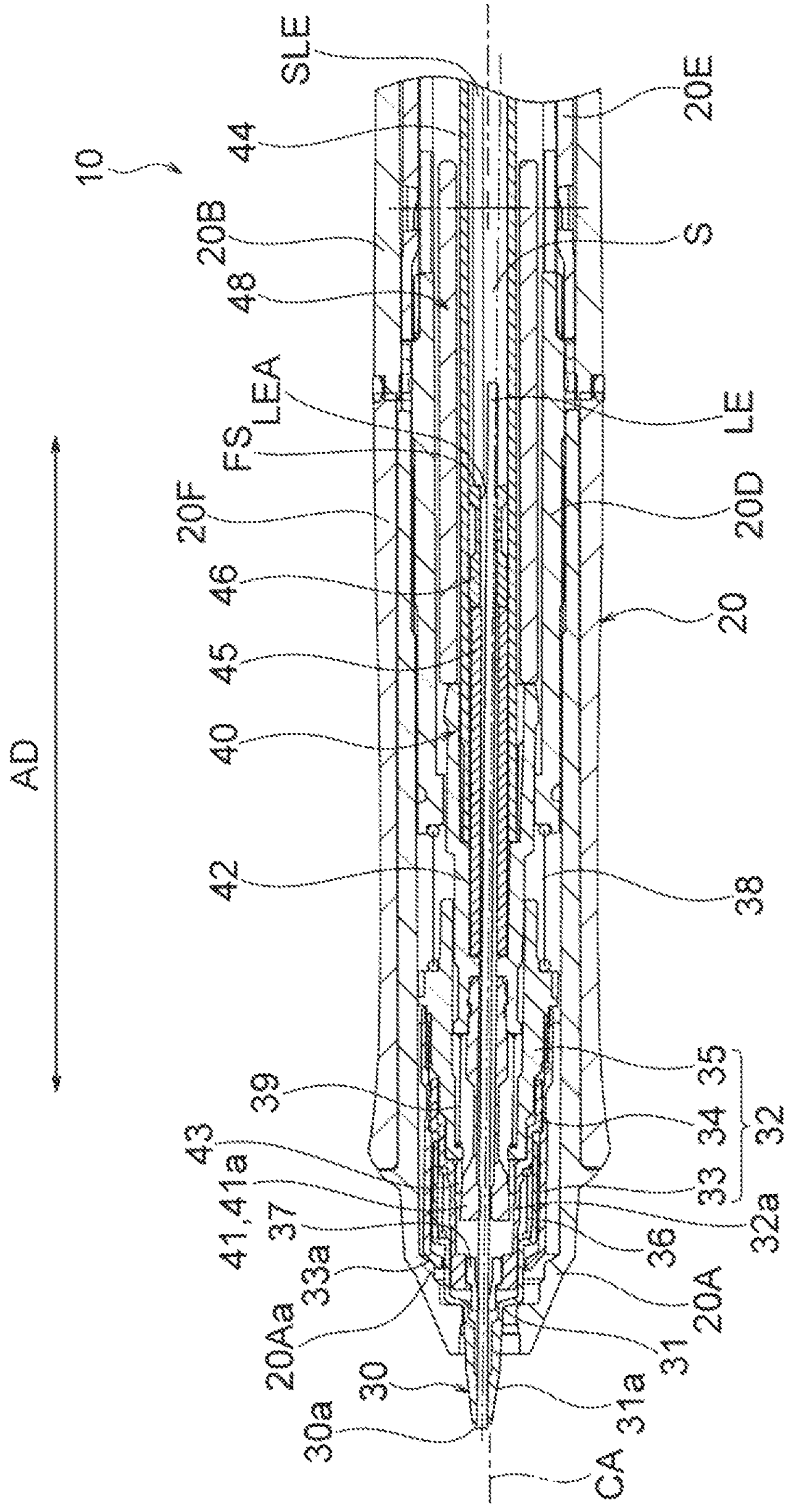
FIG. 13 is a view corresponding to FIG. 3, wherein a force in a direction non-parallel to an axial direction is applied to the lead.

When writing, the mechanical pencil 10 is usually grasped by a user such that the center axis line CA is inclined with respect to a normal direction of a sheet of paper. Thus, a writing pressure, which includes a component in the axial direction AD and a component in a direction perpendicular to the axial direction AD, is applied to a writing lead LE protruding from the front end opening 30*a*. The illustrated mechanical pencil 10 has a function of protecting the writing lead LE from such a writing pressure. An operation of the mechanical pencil 10 for protecting the writing lead LE is described herebelow with reference to FIG. 13. FIG. 13 is a longitudinal sectional view showing the front part of the mechanical pencil 10 of FIG. 1, in a state where a force (writing pressure) larger than a predetermined value is applied to the writing lead LE in a direction (radial direction) perpendicular to the axial direction AD.

As shown in FIG. 13, when a high writing pressure is applied to the writing lead LE, the ferrule unit 30 is tilted with respect to the center axis line CA as a whole by a component of the writing pressure along a direction perpendicular to the axial direction AD. At this time, the ferrule proximal end member 32 of the ferrule unit 30 comes into contact with the inner surface of the shaft tube 20. Specifically, a tapering wall part 33*a* of the first proximal end member 33 comes into contact with a guide shoulder part 20Aa of the front shaft tube 20A. The tapering wall part 33*a* of the first proximal end member 33 forms a front end portion of the ferrule proximal end member 32. The tapering wall surface 33*a* has an outer shape similar to a side surface of a cone tapering forward. On the other hand, the guide shoulder part 20Aa is formed as a protrusion protruding inward the shaft tube 20. The guide shoulder part 20Aa is provided on a front portion of the front shaft tube 20A to face the tapering wall part 33*a* in a direction perpendicular to the axial direction AD. When the tapering wall part 33*a* is pressed against the guide shoulder part 20Aa, the ferrule proximal end member 32 of the ferrule unit 30 is moved rearward with respect to the shaft tube 20 against a spring force of the ferrule pressing member 38. At this time, the lead holding unit 40 held by the ferrule proximal end member 32 is also relatively moved axially rearward with respect to the shaft tube 20, in synch with the ferrule proximal end member 32.

On the other hand, a ferrule distal end member 31 of the ferrule unit 30 is pressed forward by the distal end pressing member 36 with respect to the ferrule proximal end member 32. Thus, the ferrule distal end member 31 is relatively moved forward with respect to the ferrule proximal end member 32 and is maintained in contact with the front end portion of the shaft tube 20. As a result, the writing lead LE held by the lead holding unit 40 is moved rearward, so that the ferrule distal end member 31 can substantially maintain its position in the axial direction AD. Thus, a length of the writing lead LE protruding from the front end opening 30*a* is shortened, so as to effectively avoid the lead LE from breaking.

When a writing pressure along the axial direction AD is applied to the writing lead LE, the lead holding unit 40 holding the lead LE and the ferrule proximal end member 32 of the ferrule unit 30 are moved rearward with respect to the shaft tube 20 against a spring force of the ferrule pressing member 38. At this time, the ferrule distal end member 31 is pressed forward by the distal end pressing member 36 with respect to the ferrule proximal end member 32. As a result, the writing lead LE held by the lead holding unit 40 is moved rearward, so that the ferrule distal end member 31 can substantially maintain its position in the axial direction AD. Thus, a length of the writing lead LE protruding from the front end opening 30*a* is shortened, so as to effectively avoid the lead LE from breaking.

In the embodiment described above, the mechanical pencil 10 has the shaft tube 20, the ferrule unit 30 supported on the front end of the shaft tube 20, the lead holding unit 40 having the chuck 41 configured to relatively move with respect to the ferrule unit 30 to eject the lead LE held by the same toward the ferrule unit 30, and the indication body 70 provided movably in the axial direction AD. The indication body 70 delimits from rearward the lead storage space S formed rearward the chuck 41 in the shaft tube 20. The indication body 70 located at least a predetermined position visible from outside the shaft tube 20.

Particularly in one embodiment, the length LA along the axial direction AD between the rear end of the lead storage space S and the front end of the ferrule unit 30, in a state where the indication body 70 has moved most rearward along the axial direction AD, is equal to or more than twice the length LX of the unused spare lead SLE to be stored in the lead storage space S. Thus, even when the spare lead SLE is located to overlap the rear end of the lead LE held by the chuck 41 in the axial direction AD, the indication body 70 is moved rearward so that the spare lead SLE can be stored in the lead storage space S. For example, when new spare lead SLE is inserted from ferrule unit 30 into the mechanical pencil 10, and when the lead LE ejected from the ferrule unit 30 is returned into the mechanical pencil 10, it can be effectively avoided that the lead LE cannot be completely pushed into the mechanical pencil 10 and that the lead is broken in the lead storage space S.

In the embodiment as described above, the lead ejection aperture LEA having an internal diameter (inside dimension, inner width) allowing insertion of only single lead is opened in the front wall surface FS delimiting the lead storage space S from the front side in the axial direction AD, the lead ejection aperture LEA being in communication with the chuck 41. The front wall surface FS is inclined rearward in the axial direction AD as it separates away from the lead ejection aperture LEA along a direction perpendicular t the axial direction AD. The inclination angle θx of the front wall surface FS with respect to the axial direction AD is more than 45° and less than 85°. Thus, the front wall surface FS delimiting the lead storage space S from axially forward is inclined such that the lead storage space S tapers forward in the axial direction toward the lead ejection aperture LEA. Such a front wall surface FS can guide the spare lead SLE in the lead storage space S toward the lead ejection aperture LEA. On the other hand, the spare lead SLE is pushed forward in the axial direction by the weight of the indication body 70. Thus, there is a possibility that the spare lead SLE is pushed, like a wedge, by the weight of the indication body 70 between the lead LE with its front portion being inserted in the lead ejection aperture LEA and its rear portion extending to the lead storage space S, and the front wall surface FS. In this case, ejection of the lead inserted in the lead ejection aperture LEA may be blocked by the spare lead SLE. However, according to the specific example described herein, the inclination angle θx of the front wall surface FS with respect to the axial direction AD is set to be more than 45°. Thus, it can be effectively avoided that the distal end of the spare lead SLE pushed by the weight of the indication body 70 fits like a wedge between the lead LE held by the chuck 41 to extend up to the lead storage space S and the front wall surface FS. Thus, it can be effectively suppressed that the ejection of the lead inserted in the lead ejection aperture LEA is blocked by the spare lead SLE. On the other hand, when the lead does not extend axially rearward from the lead ejection aperture LEA, the spare lead SLE can be suitably guided to the lead ejection aperture LEA.

Further, in the embodiment as described above, the lead storage space S has, at the intermediate part in the axial direction AD, the reduced width part SC having a narrow width. Such a lead storage space S can effectively prevent the spare lead SLE stored in the lead storage space S from being largely inclined with respect to the axial direction AD. Thus, it can be effectively avoided that the distal end of the spare lead SLE pushed by the weight of the indication body 70 fits like a wedge between the lead LE held by the chuck 41 to extend up to the lead storage space S and the front wall surface FS. As a result, the ejection of the lead upon the knock operation can be made stable and smooth. In addition, since the spare lead SLE stored in the lead storage space S can be prevented from spreading toward the rear ends, attachment of the knock unit 60 can be stably performed.

Further, in the specific example of the embodiment as described above, the mechanical pencil 10 further has the intermediate tube member 50 provided in the shaft tube 20 movably in the axial direction AD. The lead holding unit 40 further has the lead storage tube 44 located rearward the chuck 41 in the axial direction AD to form at least partly the lead storage space S, the lead storage tube 44 having an open rear end inserted in the in the intermediate tube member 50. The intermediate tube member 50 has the tubular body part 51 and the inner rib 52 protruding from the inner surface of the tubular body part 51. During the forward movement along the axial direction AD, the inner rib 52 comes into contact with the rear end surface 44*a* of the lead storage tube 44 to push the lead holding unit 40 forward. In such a specific example, since the intermediate tube member 50 supported in the shaft tube 20 is provided, the lead holding unit 40 is relatively movable with respect to the intermediate tube member 50 in the axial direction AD. According to such a structure, in a state where the intermediate tube member 50 and the knock unit 60 which can be mounted on the intermediate tube member 50 are stopped in the axial direction AD, the lead holding unit 40 is movable in the axial direction AD. This structure is advantageous in a structure where the mechanical pencil 10 is shaken in the axial direction AD using the weight body 48 to eject the lead LE, and a structure where the lead holding unit 40 is retracted to protect the lead LE when a force is applied to the lead LE when writing.

Further, upon the knock operation, from the time when the intermediate tube member 50 starts moving in the axial direction AD until the time when the lead holding unit 40 starts moving in the axial direction AD, the indication body 70 remains stopped when there is spare lead SLE in the lead storage space S. On the other hand, when there is no spare lead SLE in the lead storage space S, the intermediate body 70 moves together with the intermediate tube member 50. Such an unexpected movement of the indication body 70 can draw the user's attention to the indication body, which can effectively make attractive the mechanical pencil 10 provided with the indication body 70.

Further, in the embodiment as described above, the indication body 70 has the indication body part 71 extending in the axial direction AD, the flange part 72 provided on the front end portion of the indication body part 71 to protrude from the indication body part 71 in a direction non-parallel to the axial direction AD. The provision of the flange part 72 can effectively prevent lead powder in the lead storage space S from entering between the indication body 70 and the tubular portion TP accommodating the indication body 70 movably in the axial direction AD. This can effectively avoid the inner surface of the tubular portion TP from being contaminated with lead powder so that the indication body 70 becomes difficult to be seen from outside the tubular portion TP. In addition, lead powder can be effectively avoided from going outside the shaft tube 20.

In the specific example of the embodiment as described above, the flange part 72 is provided on the front end portion of the indication body part 71. Since the flange part 72 is provided on the front end portion of the indication body part 71, lead powder can be effectively prevented from entering between the indication body 70 and the tubular portion TP. In addition, since the entering of lead powder can be prevented at the front end portion of the indication body part 71, the inner surface of the tubular portion TP can be effectively prevented from being rubbed with lead powder by the indication body 70.

In the specific example of the embodiment as described above, the flange part 72 extends in a circumferential direction around the indication body part 71. Since the flange part 72 extends in a circumferential direction around the indication body part 71, lead powder can be effectively prevented from entering between the indication body 70 and the tubular portion TP.

In the specific example of the embodiment as described above, the window part 22 allowing an inside of the shaft tube 20 to be viewed is provided on the shaft tube 20 such that the window part 22 at least partly overlaps a range where the indication body 70 is movable in the axial direction AD. The window part 22 is provided only partly in the circumferential direction of the shaft tube 20. The flange part 72 extends in the circumferential direction at least over a range where the window part 22 is provided. The provision of the flange part 72 correspondingly to the window part 22 can effectively prevent entering of lead powder between the window part 22 and the indication body 70. This can effectively prevent lead powder from putting on the window part 22 for viewing the indication body 70.

In the specific example of the embodiment as described above, the indication body 70 further has the rear flange part 73 located rearward the flange part 72 in the axial direction AD to protrude from the indication body part 71 in a direction non-parallel to the axial direction AD. Since the rear flange part 73 is provided on the indication body part 71, it can be effectively prevented that lead powder goes out from the tubular portion TP accommodating the indication body 70 movably in the axial direction AD so that lead powder flay outside the mechanical pencil 10.

Further, in the embodiment as described above, the hole H for ventilation is formed in the tubular portion TP accommodating the indication body 70 movably in the axial direction AD. Thus, the movement of the indication body 70 in the tubular portion TP along the axial direction AD can be made smooth. Thus, the position of the indication body 70 can be changed quickly in the axial direction AD depending on whether there is spare lead SLE, so that whether there is spare lead SLE can be indicated accurately based on the position of the indication body 70. In addition, since the movement of the indication body 70 in the axial direction AD can be made smooth, a gap between the indication body 70 and the tubular portion TP, e.g., a gap between the flange part 72 and/or the rear flange part 73 of the indication body 70 and the tubular portion TP can be made smaller. This can effectively prevent entering of lead powder between the indication body 70 and the tubular portion TP.

Although the one embodiment has been described with reference to the specific examples, it is not intended that these specific examples limit the embodiment. The aforementioned embodiment can be implemented in various other specific examples, and can be variously omitted, replaced, changed, added, etc., within a range not departing from the scope of the invention.

A modification example is described with reference to the drawings. In the following description and in the drawings used in the following description, for parts that can be configured in the same manner as in the above-described specific examples, the same signs as those used for corresponding parts in the above-described specific examples are used, and redundant explanations are omitted.

Figure 14:
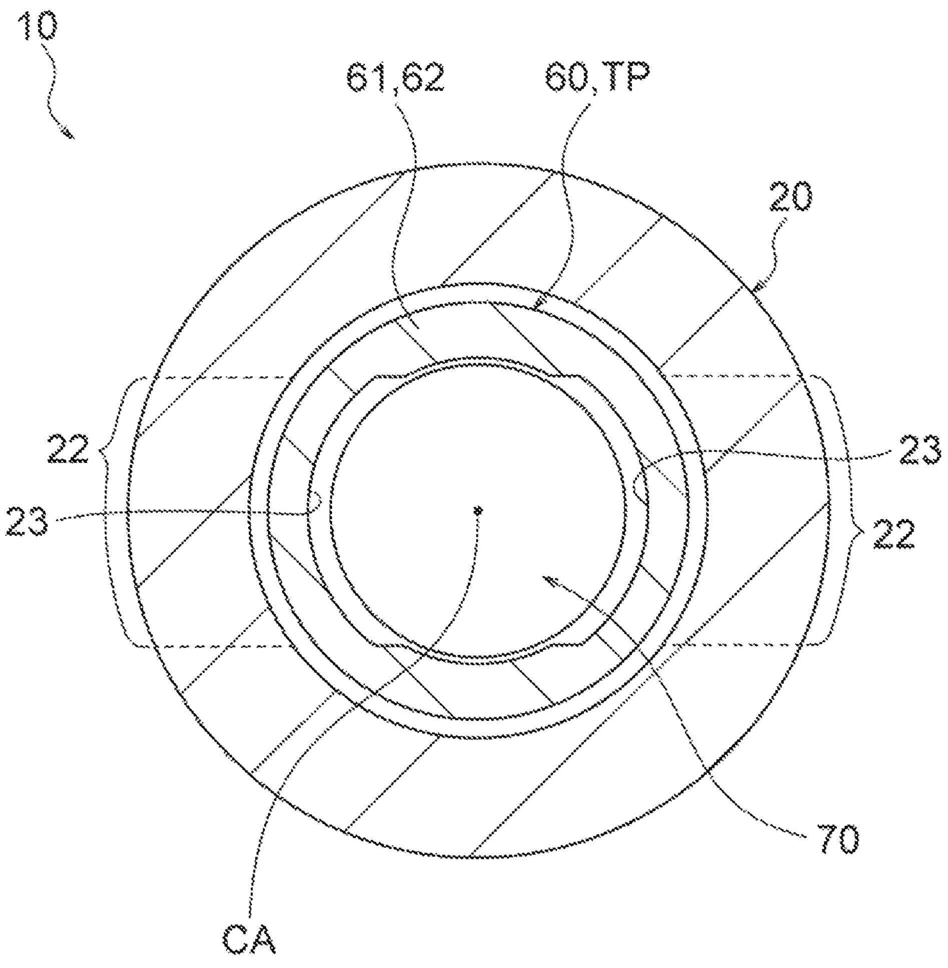
FIG. 14 is a cross-sectional view for describing a modification example of the mechanical pencil, at a position where a window part is located in the axial direction.

For example, in the aforementioned specific example, the window part 22 allowing an inside of the shaft tube 20 to be viewed is provided on the shaft tube 20 such that the window part 22 at least partly overlaps a range where the indication body 70 is movable in the axial direction AD. The window part 22 is located in a part of the shaft tube 20 in the circumferential direction. In this example, as shown in FIG. 14, a recess 23 may be formed in an inner surface of a region that is the same as the window part 22 in the circumferential direction TP accommodating the indication body 70 movably in the axial direction AD. FIG. 14 is a cross-sectional view (sectional view along plane perpendicular to axial direction AD) for describing the modification example of the mechanical pencil 10, at a position where the window part 22 is located in the axial direction AD. The inner surface of the tubular portion TP is separated from the flange parts 72 and 73 of the indication body 70 in the region that is the same as the window part 22 in the circumferential direction. This can effectively prevent lead powder from putting on the inner surface of the region of the tubular portion TP, which faces the window part 22. As a result, contamination of lead powder can be effectively prevented from being seen through the window part 22.

In the illustrated example, the knock unit 60 forms the tubular portion TP accommodating the indication body 70 movably in the axial direction AD. However, as described above, the present invention is not limited to this example. The shaft tube 20 may form the tubular portion TP accommodating the indication body 70 movably in the axial direction AD.

Further, in the illustrated example, the indication body 70 is supported in the tubular portion TP movably in the axial direction AD. In this example, the indication body 70 may be pressed forward in the axial direction. According to such an example, whether there is spare lead SLE in the lead storage space S can be indicated by the position of the indication body 70, not only when the front of the mechanical pencil 10 is located vertically downward, but also when the front of the mechanical pencil 10 is located vertically upward.

Further, in the illustrated example, the cap member 65 is screwed to the knock member 61, and the knock unit 60 is unrotatably fitted in the intermediate tube member 50. However, the present invention is not limited to this example. The knock unit 60 may be screwed to the intermediate tube member 50, and the cap member 65 may be unrotatably fitted in the knock member 61.

Although some modification examples to the aforementioned embodiment have been described above, it goes without saying that the modification examples can be suitably combined and applied.

The invention claimed is:

1. A mechanical pencil comprising:

a shaft tube;

a ferrule unit supported by the shaft tube;

a lead holding unit having a chuck configured to relatively move with respect to the ferrule unit to eject lead held by the lead holding unit; and an indication body provided movably in an axial direction and delimiting from rearward a lead storage space formed rearward the chuck in the shaft tube, wherein:

the indication body located at least at a predetermined position is viewable from outside the shaft tube; and the indication body has an indication body part extending in the axial direction, and a flange part protruding from the indication body part in a direction non-parallel to the axial direction.

2. The mechanical pencil according to claim 1, wherein the flange part is provided on a front end portion of the indication body part.

3. The mechanical pencil according to claim 1, wherein the flange part extends in a circumferential direction around the indication body part.

4. The mechanical pencil according to claim 1, wherein a window part allowing an inside of the shaft tube to be viewed is provided on the shaft tube such that the window part at least partly overlaps a range where the indication body is movable in the axial direction, and the flange part extends in the circumferential direction at least over a range where the window part is provided.

5. The mechanical pencil according to claim 1, wherein a window part allowing an inside of the shaft tube to be viewed is provided on the shaft tube such that the window part at least partly overlaps a range where the indication body is movable in the axial direction, and the flange part of the indication body supported by spare lead stored in the lead storage space from forward in the axial direction is located forward the window part in the axial direction.

6. The mechanical pencil according to claim 1, wherein a window part allowing an inside of the shaft tube to be viewed is provided on the shaft tube such that the window part at least partly overlaps a range where the indication body is movable in the axial direction, and a recess is formed in an inner surface of a region overlapping the window part in the circumferential direction of a tubular portion accommodating the indication body movably in the axial direction.

7. The mechanical pencil according to claim 1, wherein the indication body further has a rear flange part located rearward the flange part in the axial direction to protrude from the indication body part in a direction non-parallel to the axial direction.

8. The mechanical pencil according to claim 7, wherein a hole is formed in a tubular portion accommodating the indication body movably in the axial direction, and a length of the hole along the axial direction is longer than a length of the rear flange part along the axial direction.

9. The mechanical pencil according to claim 1, wherein a hole is formed in a tubular portion accommodating the indication body movably in the axial direction, and the hole is located rearward the indication body in the axial direction, the indication body having moved most rearward in the axial direction.

10. The mechanical pencil according to claim 9, further comprising a knock unit provided in the shaft tube movably in the axial direction, and configured to push the lead holding unit forward during forward movement in the axial direction, wherein the knock unit includes the tubular portion accommodating the indication body movably in the axial direction.

* * * * *